(12) United States Patent
MolavianJazi et al.

(10) Patent No.: US 12,538,278 B2
(45) Date of Patent: Jan. 27, 2026

(54) RESOURCE IDENTIFICATION FOR REPEATERS

(71) Applicant: Samsung Electronics Co., Ltd., Suwon-si (KR)

(72) Inventors: Ebrahim MolavianJazi, San Jose, CA (US); Marian Rudolf, Longueuil (CA); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 18/358,838

(22) Filed: Jul. 25, 2023

(65) Prior Publication Data

US 2024/0049197 A1 Feb. 8, 2024

Related U.S. Application Data

(60) Provisional application No. 63/458,035, filed on Apr. 7, 2023, provisional application No. 63/446,706, filed on
(Continued)

(51) Int. Cl.
*H04W 72/0446* (2023.01)
*H04W 16/26* (2009.01)
(Continued)

(52) U.S. Cl.
CPC ....... *H04W 72/0446* (2013.01); *H04W 16/26* (2013.01); *H04W 72/046* (2013.01); *H04W 72/23* (2023.01)

(58) Field of Classification Search
CPC ............. H04W 72/0446; H04W 16/26; H04W 72/046; H04W 72/23; H04W 84/047;
(Continued)

(56) References Cited

U.S. PATENT DOCUMENTS

2020/0344813 A1 10/2020 Li et al.
2021/0037486 A1* 2/2021 Li .......................... H04W 24/08
(Continued)

OTHER PUBLICATIONS

International Search Report and Written Opinion issued Nov. 6, 2023 regarding International Application No. PCT/KR2023/011475, 6 pages.
(Continued)

*Primary Examiner* — Hoang-Chuong Q Vu

(57) ABSTRACT

Apparatuses and methods for ON-OFF indication for repeaters. A method for a network-controlled repeater (NCR) includes receiving, by an NCR mobile termination (NCR-MT) entity, first information for a first time-domain resource and for a corresponding first beam for an access link of an NCR forwarding (NCR-Fwd) entity and second information for a second time-domain resource and for a corresponding second beam for the access link of the NCR-Fwd entity. The first time-domain resource overlaps with the second time-domain resource in a first set of symbols. The first time-domain resource is not associated with a priority flag. The second time-domain resources is associated with the priority flag. The method further includes receiving or transmitting a first radio frequency (RF) signal on the access link using the second beam over the first set of symbols.

20 Claims, 14 Drawing Sheets

Related U.S. Application Data on Feb. 17, 2023, provisional application No. 63/409,087, filed on Sep. 22, 2022, provisional application No. 63/396,148, filed on Aug. 8, 2022.

(51) Int. Cl.
  *H04W 72/044* (2023.01)
  *H04W 72/23* (2023.01)

(58) Field of Classification Search
  CPC . H04W 72/231; H04W 72/232; H04W 72/56; H04B 7/15542; H04B 7/15528; H04B 7/06952; H04L 5/0053
  See application file for complete search history.

(56) References Cited

U.S. PATENT DOCUMENTS

| | | | | |
|---|---|---|---|---|
| 2021/0075474 | A1* | 3/2021 | Raghavan | H04B 7/0626 |
| 2021/0235476 | A1* | 7/2021 | Luo | H04W 40/22 |
| 2022/0015095 | A1* | 1/2022 | Liu | H04L 5/1469 |
| 2022/0053433 | A1 | 2/2022 | Abedini et al. | |
| 2022/0286196 | A1* | 9/2022 | Luo | H04B 7/15542 |
| 2023/0008206 | A1* | 1/2023 | Yang | H04W 76/15 |
| 2023/0130003 | A1* | 4/2023 | Ali | H04W 56/001 370/329 |
| 2023/0283358 | A1* | 9/2023 | Rudolf | H04B 7/15528 |
| 2023/0327735 | A1* | 10/2023 | Awadin | H04W 72/231 |
| 2025/0133416 | A1* | 4/2025 | Kumagai | H04W 24/10 |
| 2025/0202565 | A1* | 6/2025 | Nilsson | H04B 7/06952 |

OTHER PUBLICATIONS

Nokia et al., "Discussion on L1/L2 signaling for side control information of Network-Controlled Repeater", 3GPP TSG RAN WG1 #109-e, R1-2203355, May 2022, 6 pages.

Nokia et al., "Discussion on side control information to enable NR network-controlled repeaters", 3GPP TSG RAN WG1 #109-e, R1-2203354, May 2022, 6 pages.

Qualcomm Incorporated, "On side control information for network controlled repeaters (NCR)", 3GPP TSG RAN WG1 #109-e, R1-2205047, May 2022, 13 pages.

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer procedures for control (Release 17)", 3GPP TS 38.213 V17.0.0, Dec. 2021, 225 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"3rd Generation Partnership Project; Technical Specification Group Radio Access Network; NR; Physical layer measurements (Release 17)", 3GPP TS 38.215 V17.0.0, Dec. 2021, 26 pages.

"5G; NR; Medium Access Control (MAC) protocol specification (3GPP TS 38.321 version 16.7.0 Release 16)", ETSI TS 138 321 V16.7.0, Jan. 2022, 160 pages.

"5G; NR; Radio Resource Control (RRC); Protocol specification (3GPP TS 38.331 version 16.7.0 Release 16)", ETSI TS 138 331 V16.7.0, Jan. 2022, 950 pages.

"5G; NR; NR and NG-RAN Overall description; Stage-2 (3GPP TS 38.300 version 16.8.0 Release 16)", ETSI TS 138 300 V16.8.0, Jan. 2022, 155 pages.

"3rd Generation Partnership Project; Technical Specification Group Radio Access network; Study on NR network-controlled repeaters (Release 18)", 3GPP TR 38.867 V18.0.0, Sep. 2022, 21 pages.

* cited by examiner

RESOURCE IDENTIFICATION FOR REPEATERS

CROSS-REFERENCE TO RELATED APPLICATION AND CLAIM OF PRIORITY

This application claims priority under 35 U.S.C. § 119(e) to U.S. Provisional Patent Application No. 63/369,148 filed on Aug. 8, 2022, U.S. Provisional Patent Application No. 63/409,087 filed on Sep. 22, 2022, U.S. Provisional Patent Application No. 63/446,706 filed on Feb. 17, 2023, and U.S. Provisional Patent Application No. 63/458,035 filed on Apr. 7, 2023. The above-identified provisional patent applications are hereby incorporated by reference in their entirety.

TECHNICAL FIELD

The present disclosure relates generally to wireless communication systems and, more specifically, to resource identification for repeaters in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for resource identification for repeaters.

In one embodiment, a method for a network-controlled repeater (NCR) is provided. The method includes receiving, by an NCR mobile termination (NCR-MT) entity, first information for first time-domain resources and for corresponding first beams for an access link of an NCR forwarding (NCR-Fwd) entity and second information for second time-domain resources and for corresponding second beams for the access link of the NCR-Fwd entity. A first time-domain resource from the first time-domain resources overlaps with a second time-domain resource from the second time-domain resources in a first set of symbols. The first time-domain resource corresponds to a first beam from the first beams. The second time-domain resource corresponds to a second beam from the second beams. The first time-domain resources are not associated with a priority flag. The second time-domain resources are associated with the priority flag. The method further includes receiving or transmitting, by the NCR-Fwd entity, a first radio frequency (RF) signal on the access link using the second beam over the first set of symbols.

In another embodiment, a NCR is provided. The NCR includes a transceiver of an NCR-MT entity configured to receive first information for first time-domain resources and for corresponding first beams for an access link of an NCR-Fwd entity, and second information for second time-domain resources and for corresponding second beams for the access link of the NCR-Fwd entity. A first time-domain resource from the first time-domain resources overlaps with a second time-domain resource from the second time-domain resources in a first set of symbols. The first time-domain resource corresponds to a first beam from the first beams. The second time-domain resource corresponds to a second beam from the second beams. The first time-domain resources are not associated with a priority flag. The second time-domain resources are associated with the priority flag. The NCR further includes a processor of the NCR-MT entity operably coupled to the transceiver of the NCR-MT entity. The processor of the NCR-MT entity is configured to determine an association between the first and second time-domain resources and the priority flag. The NCR further includes a transceiver of the NCR-Fwd entity operably coupled to the processor of the NCR-MT entity. The transceiver of the NCR-Fwd entity is configured to receive or transmit a first RF signal on the access link using the second beam over the first set of symbols.

In yet another embodiment, a base station is provided. The base station includes a transceiver configured to transmit, to a NCR-MT entity, first information for first time-domain resources and for corresponding first beams for an access link of a NCR-Fwd entity and second information for second time-domain resources and for corresponding second beams for the access link of the NCR-Fwd entity. A first time-domain resource from the first time-domain resources overlaps with a second time-domain resource from the second time-domain resources in a first set of symbols. The first time-domain resource corresponds to a first beam from the first beams. The second time-domain resource corresponds to a second beam from the second beams. The first time-domain resources are not associated with a priority flag. The second time-domain resources are associated with the priority flag. The base station further includes a processor operably coupled to the transceiver. The processor is configured to determine an association between the first and second time-domain resources the priority flag. The transceiver is further configured to transmit or receive a first RF signal on a backhaul link of the NCR-Fwd entity over the first set of symbols.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
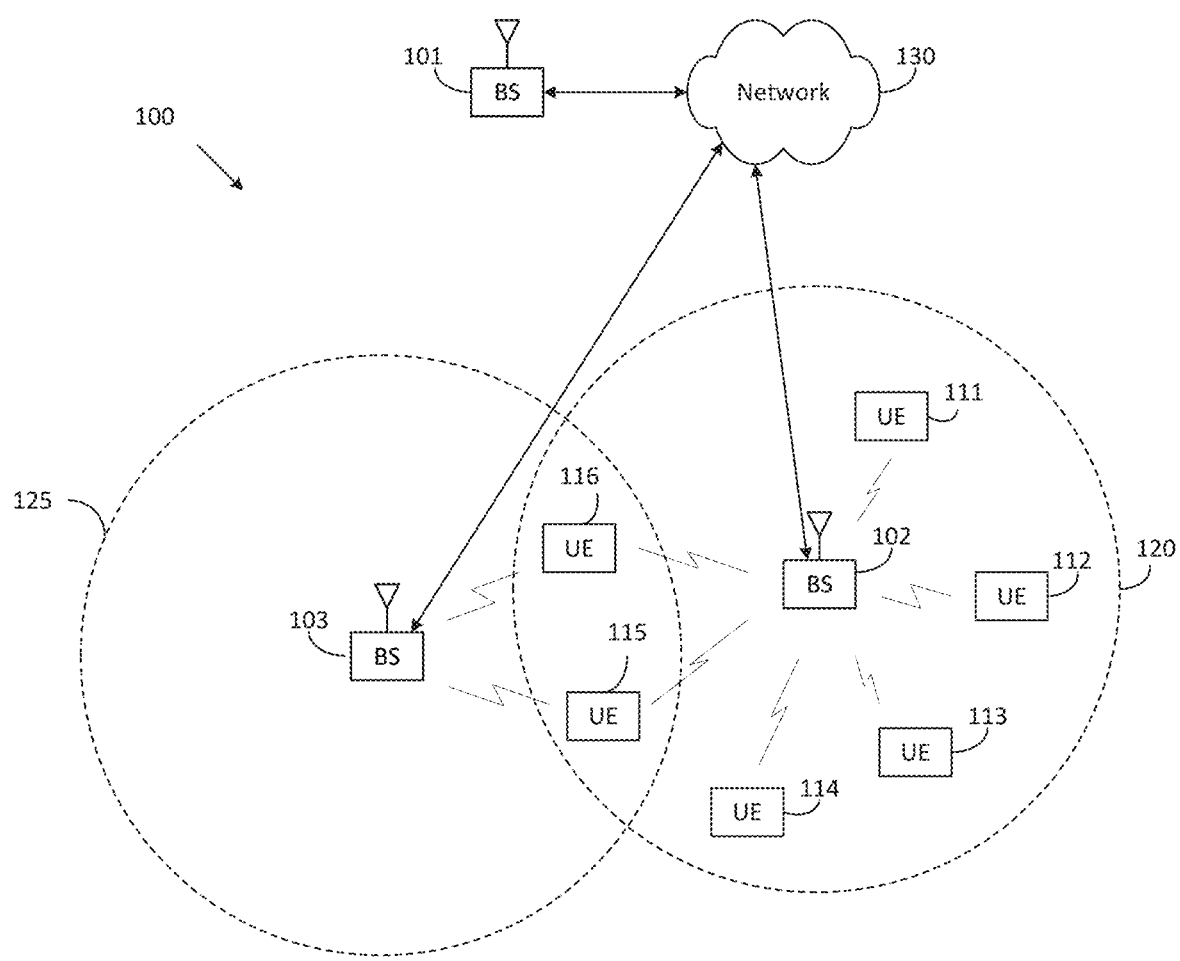
FIG. 1 illustrates an example wireless network according to embodiments of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.0.0, "NR, Physical Channels and Modulation" (herein "REF 1"); 3GPP TS 38.212 v17.0.0, "NR, Multiplexing and Channel Coding" (herein "REF 2"); 3GPP TS 38.213 v17.0.0, "NR, Physical Layer Procedures for Control" (herein "REF 3"); 3GPP TS 38.214 v17.0.0, "NR, Physical Layer Procedures for Data" (herein "REF 4"); 3GPP TS 38.215 v17.0.0, "NR, Physical Layer Measurements" (herein "REF 5"); 3GPP TS 38.321 v16.7.0, "NR, Medium Access Control (MAC) Protocol Specification" (herein "REF 6"); 3GPP TS 38.331 v16.7.0, "NR, Radio Resource Control (RRC) Protocol Specification" (herein "REF 7"); 3GPP TS 38.300 v16.8.0, "NR, NR and NG-RAN Overall Description; Stage 2" (herein "REF 8"); and 3GPP TR 38.867 v18.0.0, "Study on NR Network-Controlled Repeaters; (Release 18)" (herein "REF 9").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

5G radio supports flexible spectrum utilization from 400 MHz to 90 GHz for licensed, unlicensed, and shared spectrum bands, narrow-band and wideband allocations with bandwidth parts, carrier aggregation, dual-connectivity, and dynamic spectrum sharing, achieves higher spectrum occupancy than LTE, and utilizes flexible control channel assignments in time and frequency domains. In-built support since 3GPP Release 15 for massive MIMO and beamforming greatly enhances achievable coverage and spectral efficiency when using 5G radio. Flexible orthogonal frequency division multiplexing (OFDM) numerology, short transmission time and scheduling delays, self-contained slots, asynchronous hybrid automatic repeat request acknowledgement (HARQ), minimal overhead from DL common signals and channels, adaptive reference signals and low-density parity check (LDPC) and Polar channel coding enable more flexibility and faster processing with 5G radio when compared to LTE.

In addition, 5G radio provides optimized support for additional services and features in 3GPP Release 16 such as vehicular (V2X) and device-to-device (D2D) communications, wireless backhauling (IAB), coordinated multi-point (COMP) or Multi-TRP transmission and reception (multi-TRP), cross-link interference (CLI) and remote interference (RIM) detection and avoidance, and NR operation in unlicensed bands (NR-U).

Various embodiments of the present disclosure recognize that interference management is needed for a network-controlled (NetCon) repeater (NCR), also known as smart repeater (SR), so that the gNB can control in which time/frequency resources the NCR is performing amplify-and-forward operation. In particular, the gNB should be able to switch OFF the NCR when deemed necessary, in order to avoid interference to serving cells or neighbor cells. Various embodiments of the present invention also recognize issues with determining the relationship between higher layer indications for ON-OFF information and L1/L2 signalings for ON-OFF information corresponding to a NCR forwarding unit (NCR-Fwd), also referred to as NCR remote/radio unit (RU).

Accordingly, various embodiments of the present disclosure provide methods and apparatuses for ON-OFF information indication for smart repeaters (SR), also known as network-controlled repeaters. Herein, ON-OFF information refers to configuration or indication from gNB to NCR about an ON state in which the NCR-Fwd is switched on and operational to perform an amplify and forward operation, or an OFF state in which the NCR-Fwd is switched off or not operational so the NCR-Fwd does not perform an amplify and forward operation.

FIGS. 1-5 below describe various embodiments implemented in wireless communications systems and with the use of orthogonal frequency division multiplexing (OFDM) or orthogonal frequency division multiple access (OFDMA) communication techniques. The descriptions of FIGS. 1-5 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for communicating with repeaters. In certain embodiments, one or more of the BSs 101-103 include circuitry, programming, or a combination thereof to support resource indication for repeaters.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
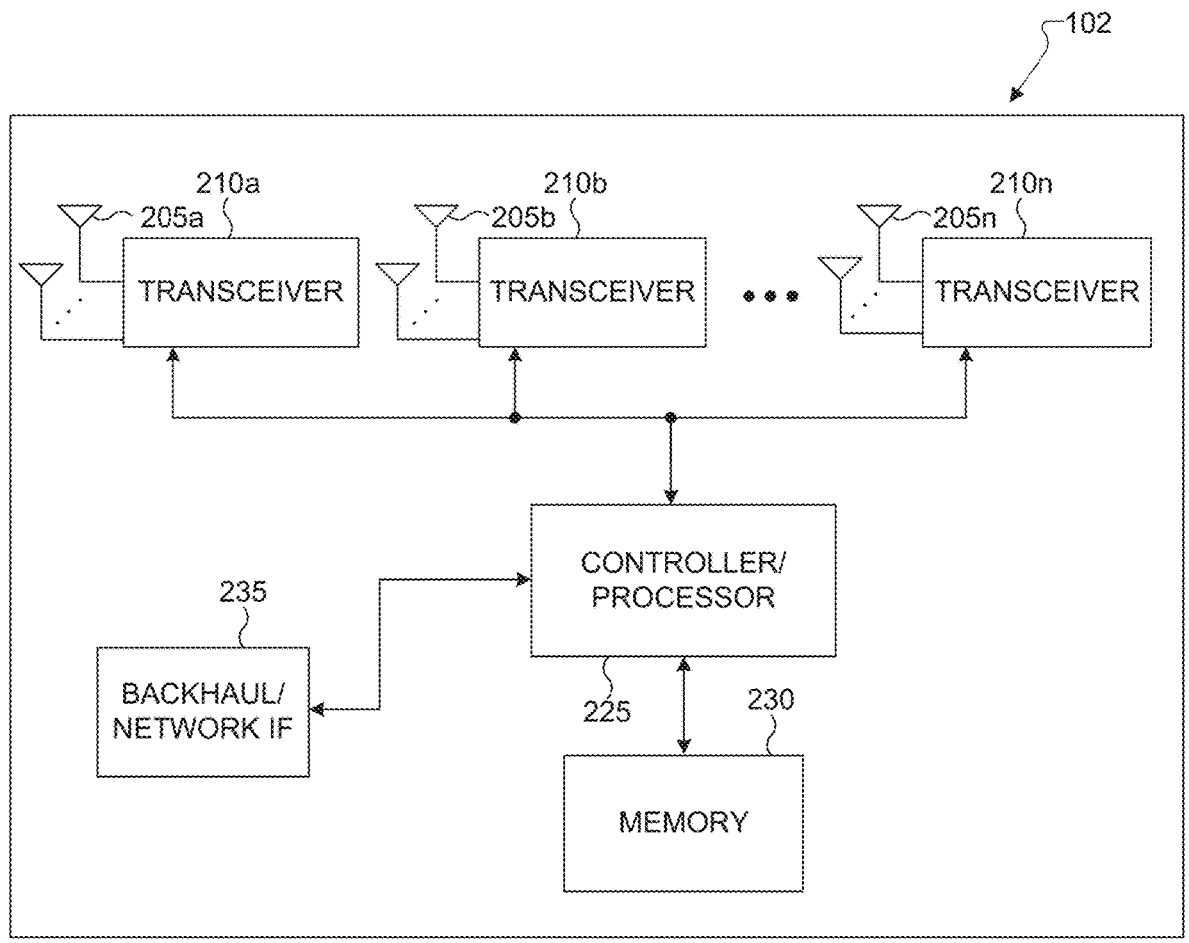
FIG. 2 illustrates an example transmit receive point (TRP) according to embodiments of the present disclosure.

FIG. 2 illustrates an example TRP 200 according to embodiments of the present disclosure. For example, the TRP 200 any be a base station, such as gNB 101-103, or may be an NCR or smart repeater. The embodiment of the TRP 200 illustrated in FIG. 2 is for illustration only. However, TRPs come in a wide variety of configurations, and FIG. 2 does not limit the scope of this disclosure to any particular implementation of a TRP.

As shown in FIG. 2, the TRP 200 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs or gNBs in the network 100. In various embodiments, certain of the transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals. For example, in embodiments where the TRP is a repeater, one or more of the transceivers 210 may be used for an NCR radio unit (NCR-RU) entity or NCR forwarding (NCR-Fwd) entity as a DL connection for signaling over an access link with a UE and/or over a backhaul link with a gNB. In these examples, the associated one(s) of the transceivers 210 for the NCR-RU entity or NCR-Fwd entity may not covert the incoming RF signal to IF or a baseband signal but rather amplify the incoming RF signal and forward or relay the amplified signal, without any down conversion to IF or baseband. In another example, in embodiments where the TRP is a repeater, one or more of the transceivers 210 may be used for an NCR mobile termination (NCR-MT) entity as a DL or UL connection for control signaling over a control link (C-link) with a gNB.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the TRP 200. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the TRP 200 by the controller/processor 225.

The controller/processor 225 is also capable of executing programs and other processes resident in the memory 230, processes to support an resource identification for repeaters in accordance with various embodiments of the present disclosure. For The controller/processor 225 can move data into or out of the memory 230 as required by an executing process.

The controller/processor 225 is also coupled to the backhaul or network interface 235. The backhaul or network interface 235 allows the TRP 200 to communicate with other devices or systems over a backhaul connection or over a network. The interface 235 could support communications over any suitable wired or wireless connection(s). For example, when the TRP 200 is implemented as part of a cellular communication system (such as one supporting 5G/NR, LTE, or LTE-A), the interface 235 could allow the TRP 200 to communicate with other gNBs over a wired or wireless backhaul connection, for example, using a transceiver, such as described above with regard to transceivers 210. For example, in embodiments where the TRP is a repeater, the interface 235 may be used for an NCR-RU or NCR-Fwd entity as a backhaul connection with a gNB over a backhaul link for control signaling and/or data to be transmitted to and/or received from a UE. When the TRP 200 is implemented as an access point, the interface 235 could allow the TRP 200 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

In various embodiments, the TRP 200 may be utilized as an NCR or smart repeater. For example, the TRP 200 may communicate with a base station 102 via a wireless backhaul over interface 235 via a NCR mobile termination (NCR-MT) entity for control information and may communicate via transceivers 210 with the a UE 116 to communicate data information via an NCR forwarding (NCR-Fwd) entity as described in greater detail below.

Although FIG. 2 illustrates one example of TRP 200, various changes may be made to FIG. 2. For example, the TRP 200 could include any number of each component shown in FIG. 2. Also, various components in FIG. 2 could be combined, further subdivided, or omitted and additional components could be added according to particular needs.

Figure 3:
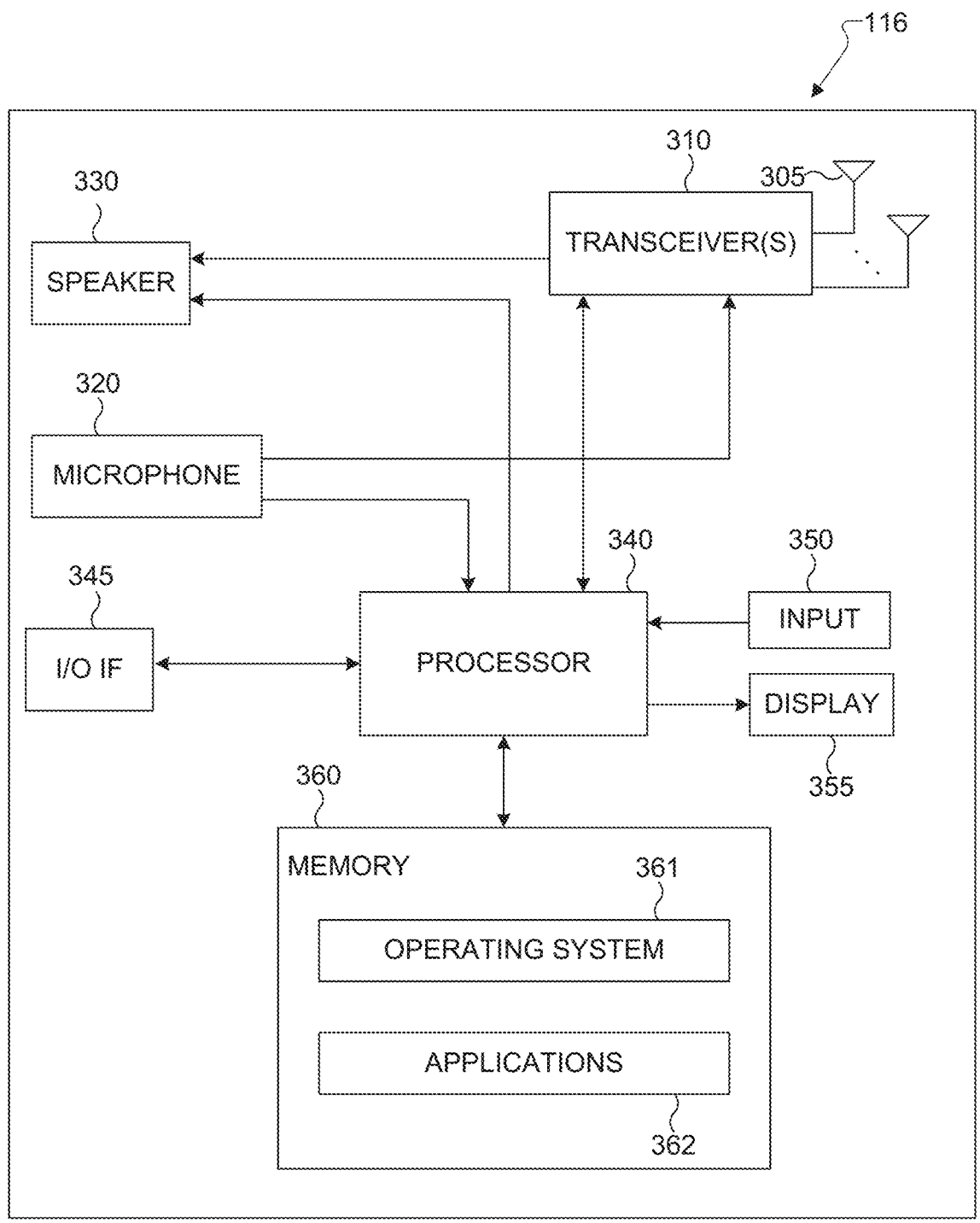
FIG. 3 illustrates an example user equipment (UE) according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes to communicate with a repeater. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
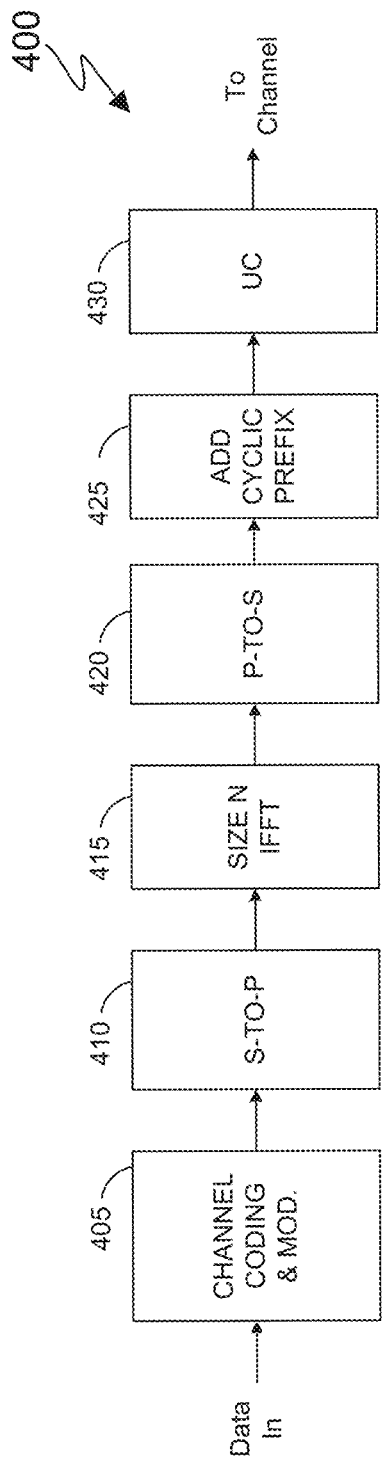
FIGS. 4 and 5 illustrate example wireless transmit and receive paths according to embodiments of the present disclosure.
Figure 5:
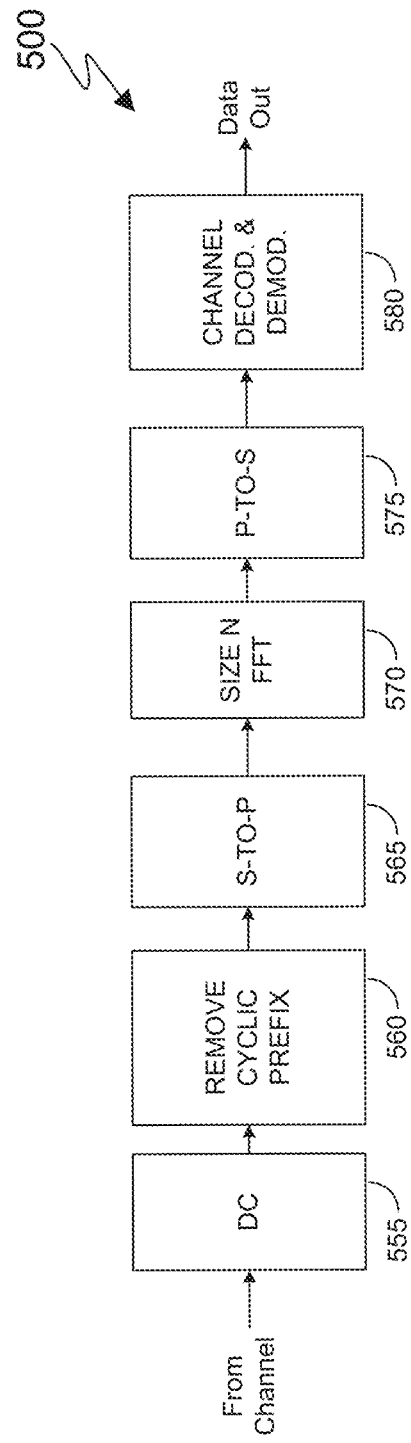

FIG. 4 and FIG. 5 illustrate example wireless transmit and receive paths according to this disclosure. In the following description, a transmit path 400, of FIG. 4, may be described as being implemented in an gNB or TRP (such as the gNB 102 or TRP 200), while a receive path 500, of FIG. 5, may be described as being implemented in a UE (such as a UE 116). However, it may be understood that the receive path 500 can be implemented in a BS or TRP and that the transmit path 400 can be implemented in a UE. In various embodiments, one or more of the receive path 500 and/or transmit path 400 may be implemented in a repeater. In some embodiments, the receive path 500 and/or transmit path 400 is configured to facilitate an resource identification for repeaters as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A communication system can include a downlink (DL) that refers to transmissions from a base station (such as the BS 102) or one or more transmission points to UEs (such as the UE 116) and an uplink (UL) that refers to transmissions from UEs (such as the UE 116) to a base station (such as the BS 102) or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB (such as the BS 102) transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE (such as the UE 116) can determine CSI-RS transmission parameters through DL control signaling or higher layer signaling, such as radio resource control (RRC) signaling, from a gNB (such as the BS 102). Transmission instances of a CSI-RS can be indicated by DL control signaling or be configured by higher layer signaling. A DM-RS is transmitted only in the BW of a respective PDCCH or PDSCH and a UE can use the DM-RS to demodulate data or control information.

In certain embodiments, UL signals also include data signals conveying information content, control signals conveying UL control information (UCI), DM-RS associated with data or UCI demodulation, sounding RS (SRS) enabling a gNB to perform UL channel measurement, and a RA preamble enabling a UE to perform RA (see also NR specification). A UE transmits data information or UCI through a respective PUSCH or a physical UL control channel (PUCCH). A PUSCH or a PUCCH can be transmitted over a variable number of slot symbols including one slot symbol. The gNB can configure the UE to transmit signals on a cell within an active UL bandwidth part (BWP) of the cell UL BW.

UCI includes HARQ acknowledgement (ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a MIMO transmission principle, and of a rank indicator (RI) indicating a transmission rank for a PDSCH.

UL RS includes DM-RS and SRS. DM-RS is transmitted only in a BW of a respective PUSCH or PUCCH transmission. A gNB can use a DM-RS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that synchronization signal (SS)/PBCH block (also denoted as SSBs) transmitted with the same block index on the same center frequency location are quasi co-located with respect to Doppler spread, Doppler shift, average gain, average delay, delay spread, and, when applicable, spatial Rx parameters. The UE may not assume quasi co-location for any other synchronization signal SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same code division multiplexing (CDM) group is quasi co-located with respect to Doppler shift, Doppler spread, average delay, delay spread, and spatial Rx. The UE may also assume that DM-RS ports associated with a PDSCH are QCL with QCL type A, type D (when applicable) and average gain. The UE may further assume that no DM-RS collides with the SS/PBCH block.

The UE can be configured with a list of up to M transmission configuration indication (TCI) State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-colocation (QCL) relationship between one or two downlink reference signals and the DM-RS ports of the PDSCH, the DM-RS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot (n+3$N_{slot}^{subframe,\mu}$) where $N_{slot}^{subframe,\mu}$ is a number of slot per subframe for subcarrier spacing (SCS) configuration p.

Figure 6:
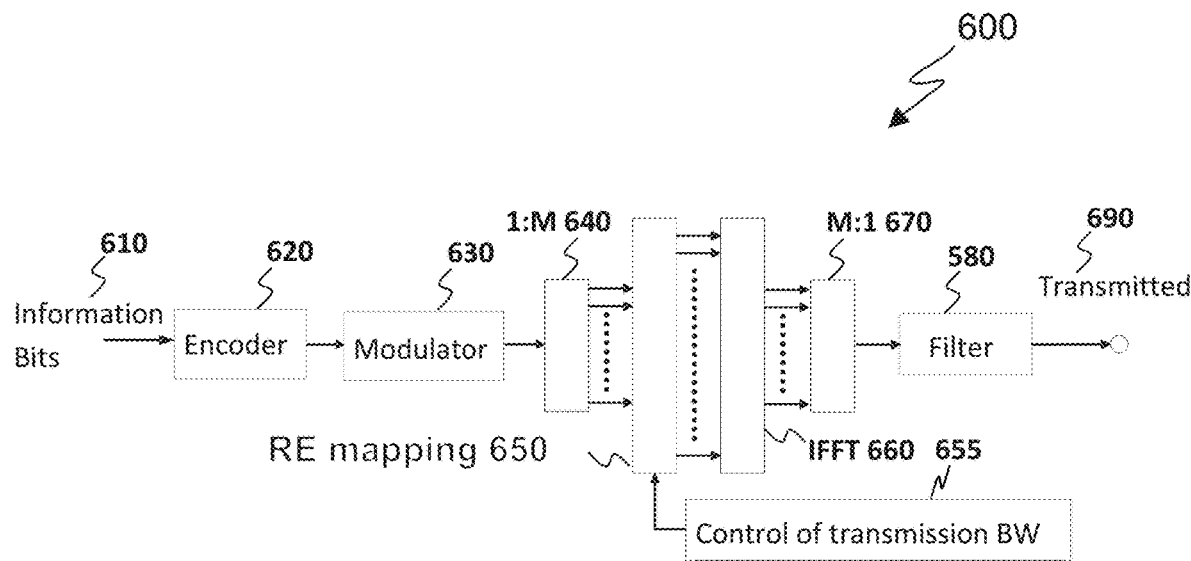
FIG. 6 illustrates a transmitter block diagram for a physical downlink shared channel (PDSCH) in a slot according to embodiments of the present disclosure.

FIG. 6 illustrates a transmitter block diagram 600 for a PDSCH in a slot according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
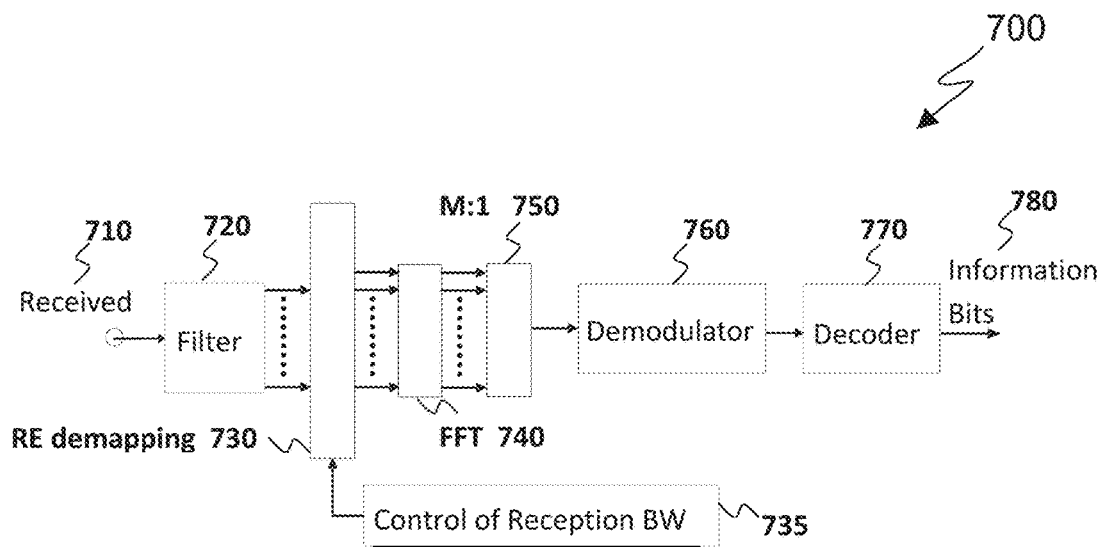
FIG. 7 illustrates a receiver block diagram for a PDSCH in a slot according to embodiments of the present disclosure.

FIG. 7 illustrates a receiver block diagram 700 for a PDSCH in a slot according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
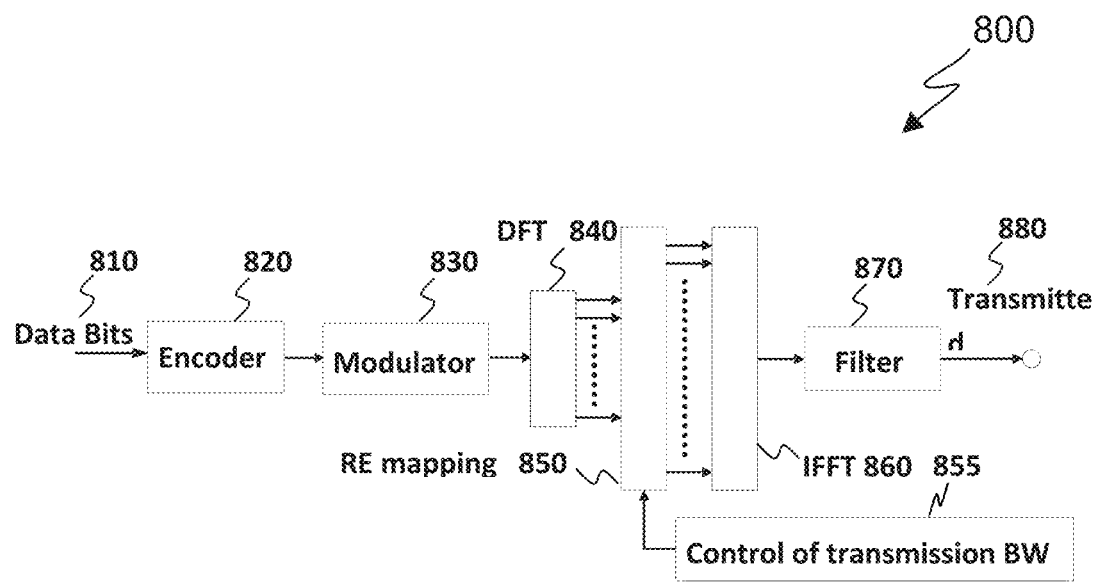
FIG. 8 illustrates a transmitter block diagram for a physical uplink shared channel (PUSCH) in a slot according to embodiments of the present disclosure.

FIG. 8 illustrates a transmitter block diagram 800 for a PUSCH in a slot according to embodiments of the present disclosure. The embodiment of the block diagram 800 illustrated in FIG. 8 is for illustration only. One or more of the components illustrated in FIG. 6 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
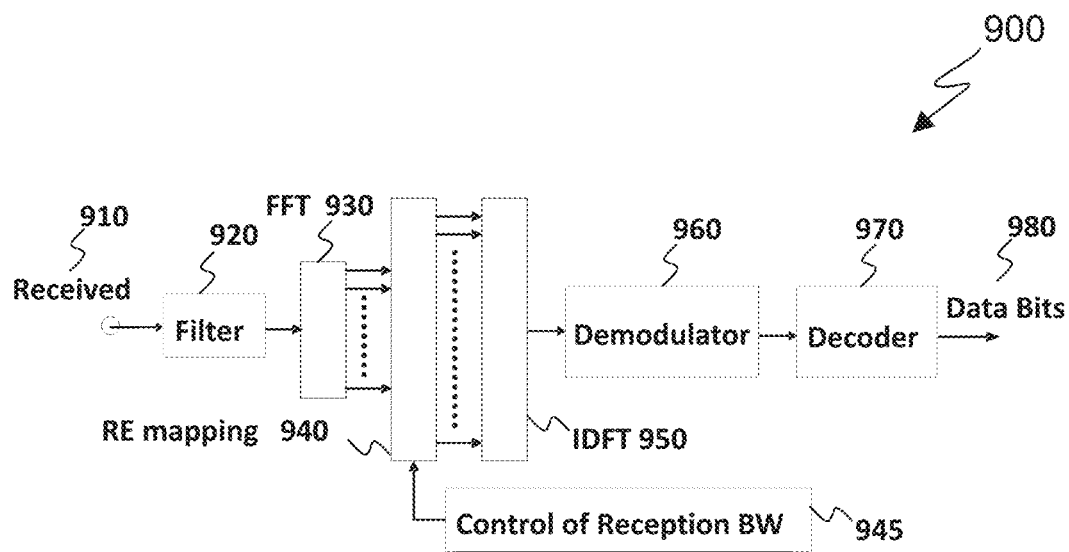
FIG. 9 illustrates a receiver block diagram for a PUSCH in a slot according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

Figure 10:
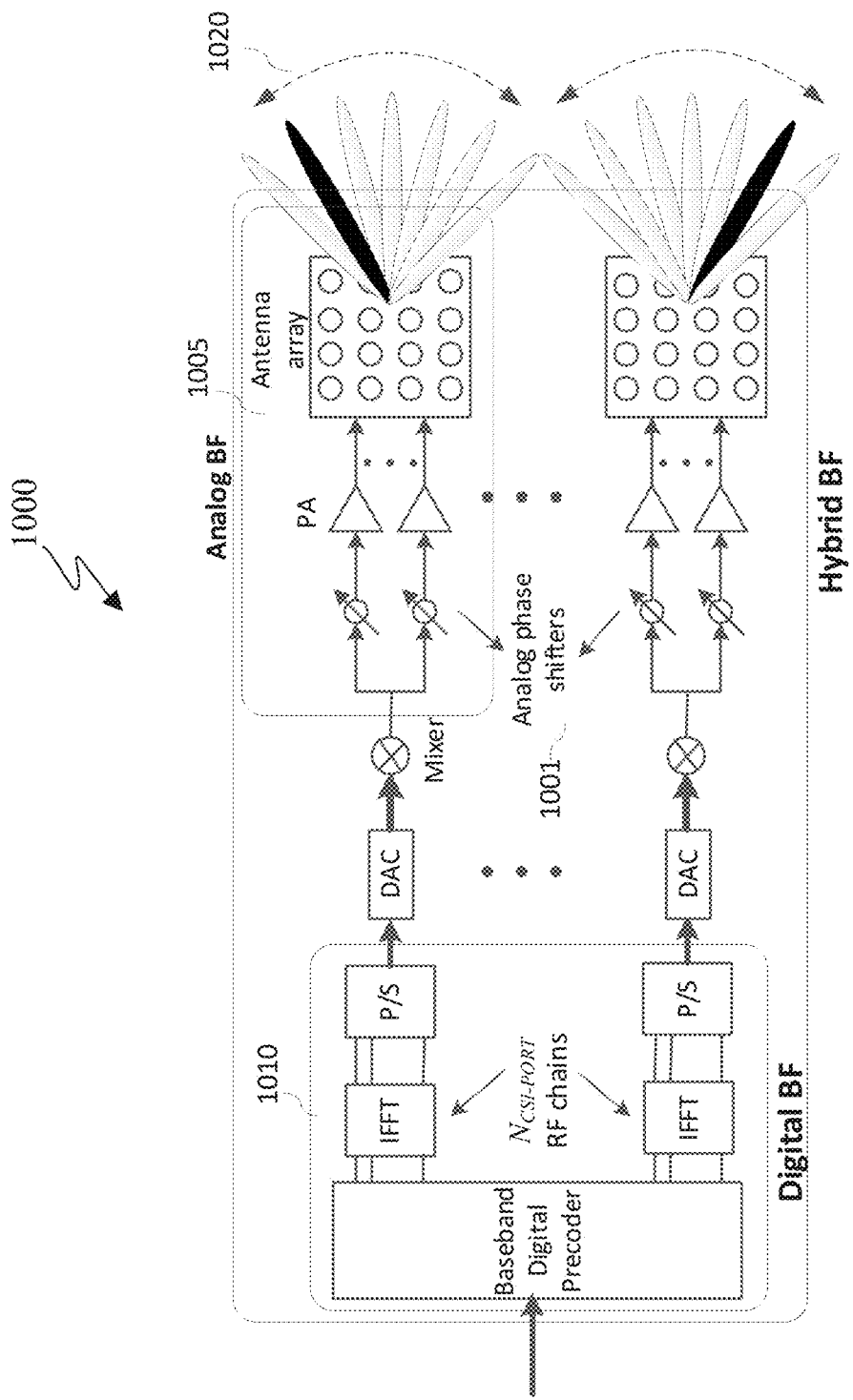
FIG. 10 illustrates an example antenna blocks or arrays forming beams according to embodiments of the present disclosure.

FIG. 10 illustrates an example antenna blocks or arrays 1000 according to embodiments of the present disclosure. For example, in various embodiments, the antenna blocks or arrays 1000 may be implemented in any of the gNBs 101-103, the TRP 200, and/or the UEs 111-116. The embodiment of the antenna blocks or arrays 1000 illustrated in FIG. 10 is for illustration only. FIG. 10 does not limit the scope of this disclosure to any particular implementation of the antenna blocks or arrays 1000.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port.

For FR2, e.g., mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports $N_{CSI-PORT}$. A digital beamforming unit 1010 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as FR2-2, e.g., >52.6 GHz. In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

In some examples, the term 'beam' is used to refer to a spatial filter for transmission or reception of a signal or a channel. For example, a beam (of an antenna) can be a main lobe of the radiation pattern of an antenna array, or a sub-array or an antenna panel, or of multiple antenna arrays, sub-arrays or panels combined, that are used for such transmission or reception.

In the present disclosure, the frequency resolution (reporting granularity) and span (reporting bandwidth) of CSI or calibration coefficient reporting can be defined in terms of frequency "subbands" and "CSI reporting band" (CRB), respectively.

A subband for CSI or calibration coefficient reporting is defined as a set of contiguous PRBs which represents the smallest frequency unit for CSI or calibration coefficient reporting. The number of PRBs in a subband can be fixed for a given value of DL system bandwidth, configured either semi-statically via higher layer/RRC signaling, or dynamically via L1 DL control signaling or MAC control element (MAC CE). The number of PRBs in a subband can be included in CSI or calibration coefficient reporting setting. The term "CSI reporting band" is defined as a set/collection of subbands, either contiguous or non-contiguous, wherein CSI or calibration coefficient reporting is performed. For example, CSI or calibration coefficient reporting band can include all the subbands within the DL system bandwidth. This can also be termed "full-band". Alternatively, CSI or calibration coefficient reporting band can include only a collection of subbands within the DL system bandwidth. This can also be termed "partial band". The term "CSI reporting band" is used only as an example for representing a function. Other terms such as "CSI reporting subband set" or "CSI or calibration coefficient reporting bandwidth" can also be used.

In terms of UE configuration, a UE can be configured with at least one CSI or calibration coefficient reporting band. This configuration can be semi-static (via higher-layer signaling or RRC) or dynamic (via MAC CE or L1 DL control signaling). When configured with multiple (N) CSI or calibration coefficient reporting bands (e.g., via RRC signaling), a UE can report CSI associated with n≤N CSI reporting bands. For instance, >6 GHz, large system bandwidth may require multiple CSI or calibration coefficient reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with Mn subbands when one CSI parameter for all the $M_n$ subbands within the CSI reporting band. A CSI parameter is configured with "subband" for the CSI reporting band with Mn subbands when one CSI parameter is reported for each of the Mn subbands within the CSI reporting band.

In the following and throughout the disclosure, various embodiments of the disclosure may be also implemented in any type of UE including, for example, UEs with the same, similar, or more capabilities compared to legacy 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by a system information block (SIB), such as a SIB1, or by a common RRC signaling, or by UE-specific RRC signaling.

In the following, for brevity of description, the higher layer provided TDD UL-DL frame configuration refers to tdd-UL-DL-ConfigurationCommon as example for RRC common configuration and/or tdd-UL-DL-ConfigurationDedicated as example for UE-specific configuration. The UE determines a common TDD UL-DL frame configuration of a serving cell by receiving a SIB such as a SIB1 when accessing the cell from RRC_IDLE or by RRC signaling when the UE is configured with SCells or additional SCGs by an IE ServingCellConfigCommon in RRC_CONNECTED. The UE determines a dedicated TDD UL-DL frame configuration using the IE ServingCellConfig when the UE is configured with a serving cell, e.g., add or modify, where the serving cell may be the SpCell or an SCell of an MCG or SCG. A TDD UL-DL frame configuration designates a slot or symbol as one of types 'D', 'U' or 'F' using at least one time-domain pattern with configurable periodicity.

In the following, for brevity of description, SFI refers to a slot format indicator as example that is indicated using higher layer provided IEs such as slotFormatCombination or slotFormatCombinationsPerCell and which is indicated to the UE by group common DCI format such as DCI F2_0 where slotFormats are defined in REF3.

Throughout the present disclosure, the term "configuration" or "higher layer configuration" and variations thereof (such as "configured" and so on) are used to refer to one or more of: a pre-configuration such as by OAM signaling or a system information signaling such as by a MIB or a SIB (such as SIB1), a common or cell-specific higher layer/RRC signaling, or a dedicated or UE-specific or BWP-specific or NCR-specific higher layer/RRC signaling.

The Synchronization Signal and PBCH block (SSB) consists of primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. The possible time locations of SSBs within a half-frame are determined by sub-carrier spacing and the periodicity of the half-frames where SSBs are transmitted is configured by the network. During a half-frame, different SSBs may be transmitted in different spatial directions (i.e., using different beams, spanning the coverage area of a cell).

Within the frequency span of a carrier, multiple SSBs can be transmitted. The PCIs of SSBs transmitted in different frequency locations do not have to be unique, i.e., different SSBs in the frequency domain can have different PCIs. However, when an SSB is associated with an RMSI, the SSB is referred to as a Cell-Defining SSB (CD-SSB). A PCell is associated to a CD-SSB located on the synchronization raster.

Polar coding is used for PBCH. The UE may assume a band-specific sub-carrier spacing for the SSB unless a network has configured the UE to assume a different sub-carrier spacing. PBCH symbols carry its own frequency-multiplexed DMRS. QPSK modulation is used for PBCH.

Measurement time resource(s) for SSB-based RSRP measurements may be confined within a SSB Measurement Time Configuration (SMTC). The SMTC configuration provides a measurement window periodicity/duration/offset information for UE RRM measurement per carrier frequency. For intra-frequency connected mode measurement, up to two measurement window periodicities can be configured. For RRC_IDLE, a single SMTC is configured per carrier frequency for measurements. For inter-frequency mode measurements in RRC_CONNECTED, a single SMTC is configured per carrier frequency. Note that if RSRP is used for L1-RSRP reporting in a CSI report, the measurement time resource(s) restriction provided by the SMTC window size is not applicable. Similarly, measurement time resource(s) for RSSI are confined within SMTC window duration. If no measurement gap is used, RSSI is measured over OFDM symbols within the SMTC window duration. If a measurement gap is used, RSSI is measured over OFDM symbols corresponding to overlapped time span between SMTC window duration and minimum measurement time within the measurement gap.

Integrated access and backhaul (IAB) enables wireless relaying in NG-RAN. The relaying node, referred to as IAB-node, supports access and backhauling via NR. The terminating node of NR backhauling on network side is referred to as the IAB-donor, which represents a gNB with additional functionality to support IAB. Backhauling can occur via a single or via multiple hops.

The IAB-node supports gNB-DU functionality to terminate the NR access interface to UEs and next-hop IAB-nodes, and to terminate the F1 protocol to the gNB-CU functionality on the IAB-donor. The gNB-DU functionality on the IAB-node is also referred to as IAB-DU.

In addition to the gNB-DU functionality, the IAB-node also supports a subset of the UE functionality referred to as IAB-MT, which includes, e.g., physical layer, layer-2, RRC and NAS functionality to connect to the gNB-DU of another IAB-node or the IAB-donor, to connect to the gNB-CU on the IAB-donor, and to the core network.

The IAB-node can access the network using either SA mode or EN-DC. In EN-DC, the IAB-node connects via E-UTRA to a MeNB, and the IAB-donor terminates X2-C as SgNB.

All IAB-nodes that are connected to an IAB-donor via one or multiple hops form a directed acyclic graph (DAG) topology with the IAB-donor as its root. In this DAG topology, the neighbor node of the IAB-DU or the IAB-donor-DU is referred to as child node and the neighbor node of the IAB-MT is referred to as parent node. The direction toward the child node is referred to as downstream while the direction toward the parent node is referred to as upstream. The IAB-donor performs centralized resource, topology and route management for the IAB topology.

F1-U and F1-C use an IP transport layer between IAB-DU and IAB-donor-CU. F1-U and F1-C need to be security-protected.

On the wireless backhaul, the IP layer is carried over the Backhaul Adaptation Protocol (BAP) sublayer, which enables routing over multiple hops. The IP layer can also be used for non-F1 traffic, such as OAM traffic.

On each backhaul link, the BAP PDUs are carried by BH RLC channels. Multiple BH RLC channels can be configured on each BH link to allow traffic prioritization and QoS enforcement. The BH-RLC-channel mapping for BAP PDUs is performed by the BAP entities on each IAB-node and the IAB-donor-DU.

The IAB-MT further establishes SRBs (carrying RRC and NAS) with the IAB-donor-CU. For IAB-nodes operating in EN-DC, the IAB-MT establishes one or more DRBs with the eNB and one or more DRBs with the IAB-donor-CU, which can be used, e.g., to carry OAM traffic. For SA mode, the establishment of DRBs is optional. These SRBs and DRBs are transported between the IAB-MT and its parent node over Uu access channel(s).

Coverage is a fundamental aspect of cellular network deployments. Cellular operators rely on different types of network nodes to offer blanket coverage in their deployments. Deployment of regular full-stack cells, e.g., cells served by a gNB type base stations usually based results in expensive implementation, high cost for equipment and backhaul connectivity. Their deployment is subjected to a variety of constraints such as expensive site leases. While this is the predominant deployment type encountered in practice, it is not always preferred cost-wise. As a result, other types of network nodes have been considered to increase cellular operators' economic flexibility for their network deployments.

For example, Integrated Access and Backhaul (IAB) was introduced in 5G NR Rel-16 and enhanced in Rel-17 as a new type of network node not requiring a wired backhaul. IAB nodes can be considered full-stack cells similar to gNBs. The IAB node is a new type of relay node building over the front-haul architecture and constituting a node with a dual role consisting of an IAB Distributed Unit (DU) component making it possible to appear as a regular cell to the UEs which it serves, and an IAB Mobile Terminal (MT) component inheriting many properties of a regular UE whereby the IAB node connects to its donor parent node(s) or a gNB. The IAB node is based on a Layer 2 architecture with end-to-end PDCP layer from the donor IAB node to the UE for Control Plane (CP) and User Plane (UP). IAB nodes can also be classified as re-generative relays. Every packet traversing the link between the donor node and the IAB-MT component of the IAB node, i.e., the backhaul-link, must be properly decoded and re-encoded by the IAB node for further transmission to the UE on the access link. The first version of IAB in Rel-16 NR assumes half duplex operation in TDM between access and backhaul links for transmission and reception by the IAB node but includes features for forward compatibility towards evolving IAB using full duplex operation. Rel-17 NR further enhances IAB operation with better support of full duplex implementations of IAB nodes.

Another type of network node is the RF repeater which amplifies-and-forwards any signal that it receives. RF repeaters have seen a wide range of deployments in 2G GSM/(E)GPRS, 3G WCDMA/HSPA and 4G LTE/LTE-A to supplement the coverage provided by regular full-stack cells. RF repeaters constitute the simplest and most cost-effective way to improve network coverage. The main advantages of RF repeaters are their low-cost, their ease of deployment and the fact that they do not much increase latency. The main disadvantage is that they amplify both desired signal(s) and (undesired) noise and hence, often contribute to an increase of interference levels observed at system level. Within RF repeaters, there are different categories depending on the power characteristics and the amount of spectrum that they are configured to amplify, e.g., single band, multi-band, etc. RF repeaters are considered non-regenerative type of relay nodes. RF repeaters are typically full-duplex nodes and they do not differentiate between UL and DL transmissions or receptions. LTE specifies RF repeater requirements in 36.106. Their use is limited to LTE FDD bands.

In Rel-17 NR, RF and EMC requirements in FR1 and FR2 for RF repeaters using NR were introduced. As NR often uses higher frequencies, e.g., 3-4 GHz in FR1 and above 24 GHz for FR2, propagation conditions are degraded when compared to lower frequencies in use by LTE. This exacerbates the coverage challenges for NR. More densification of cells becomes necessary. Massive MIMO operation in FR1, analog beamforming in FR2 and multi-beam operation with associated beam management in FR1 and FR2 are integral part of the NR design to cope with the challenging propagation conditions of these higher frequencies. Note that these NR frequency bands are TDD. In consequence, simultaneous or bi-directional amplify-and-forward as employed by traditional RF repeaters is not always necessary (unlike in the FDD LTE case) and can therefore be avoided. This much reduces the noise pollution problem of regular RF repeaters which amplify both (undesired) noise and desired signal(s). Beamformed transmissions and receptions to/from individual NR users are a fundamental feature and inherent to NR operation. However, the use of a simple RF repeater operating in the NR network implies that the prerequisite beamforming gains for NR operation to provide coverage are not available when relaying the NR transmissions and receptions. While a conventional RF repeater presents a very cost-effective means of extending network coverage, it has limitations when considering NR.

Therefore, a new type of network node, somewhere in-between RF repeaters and IAB nodes is a compelling proposition to try to leverage the main advantages of both. That new type of network node, i.e., a smart repeater (SR) or network-controlled (NETCON) repeater (NCR) can make use of some side control information (SCI) or NCR control information (NCI) to enable a more intelligent amplify-and-forward operation in a system with TDD access and multi-beam operation. SCI allows a network-controlled or smart repeater to perform the amplify-and-forward operation in a more efficient manner. Potential benefits include mitigation of unnecessary noise amplification, transmissions and receptions with better spatial directivity, and much simplified network integration. In the control plane (C-plane), a SR may be provided or configured by the gNB with information on semi-static and/or dynamic downlink/uplink configuration, adaptive transmitter/receiver spatial beamforming, Tx ON/OFF status, etc. In the user plane (U-plane), the SR is still non-regenerative, e.g., it employs amplify-and-forward to relay the actual UE signals from/to the gNB. SCI transmission and requires only low capacity for the control backhaul between the donor cell(s), e.g., gNB and the SR. As a result, the low-complexity and low-cost properties of RF repeaters are mostly preserved while a degree of network configurability and control is enabled similar to eIAB nodes.

Figure 11:
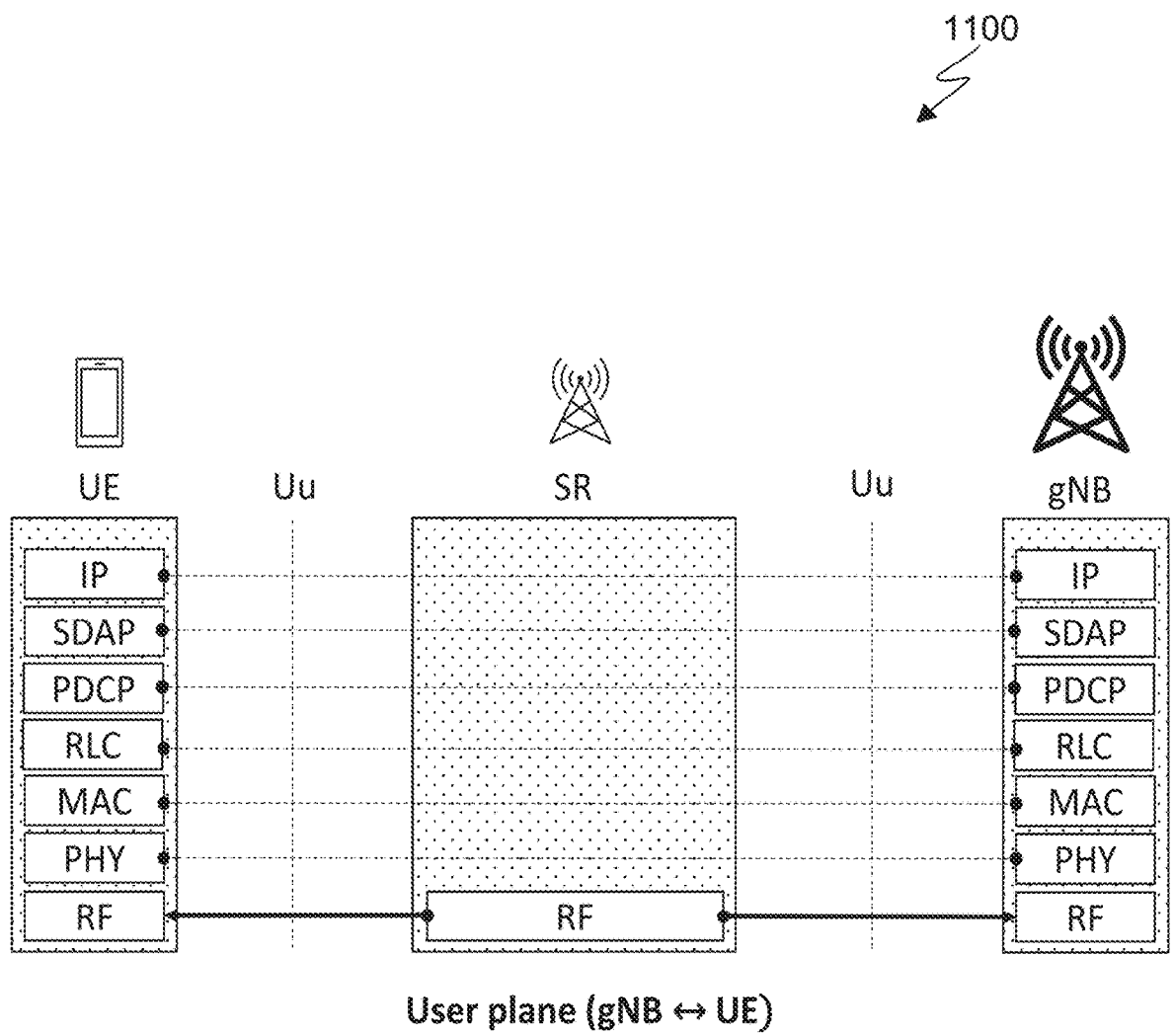
FIG. 11 illustrates an example user plane protocol architecture for smart repeater according to embodiments of the present disclosure.

FIG. 11 illustrates an example user plane protocol architecture for a smart repeater 1100 according to embodiments of the present disclosure. The embodiment of the user plane protocol architecture for the smart repeater 1100 illustrated in FIG. 11 is for illustration only. FIG. 11 does not limit the scope of this disclosure to any particular implementation of the user plane protocol architecture for the smart repeater 1100.

Figure 12:
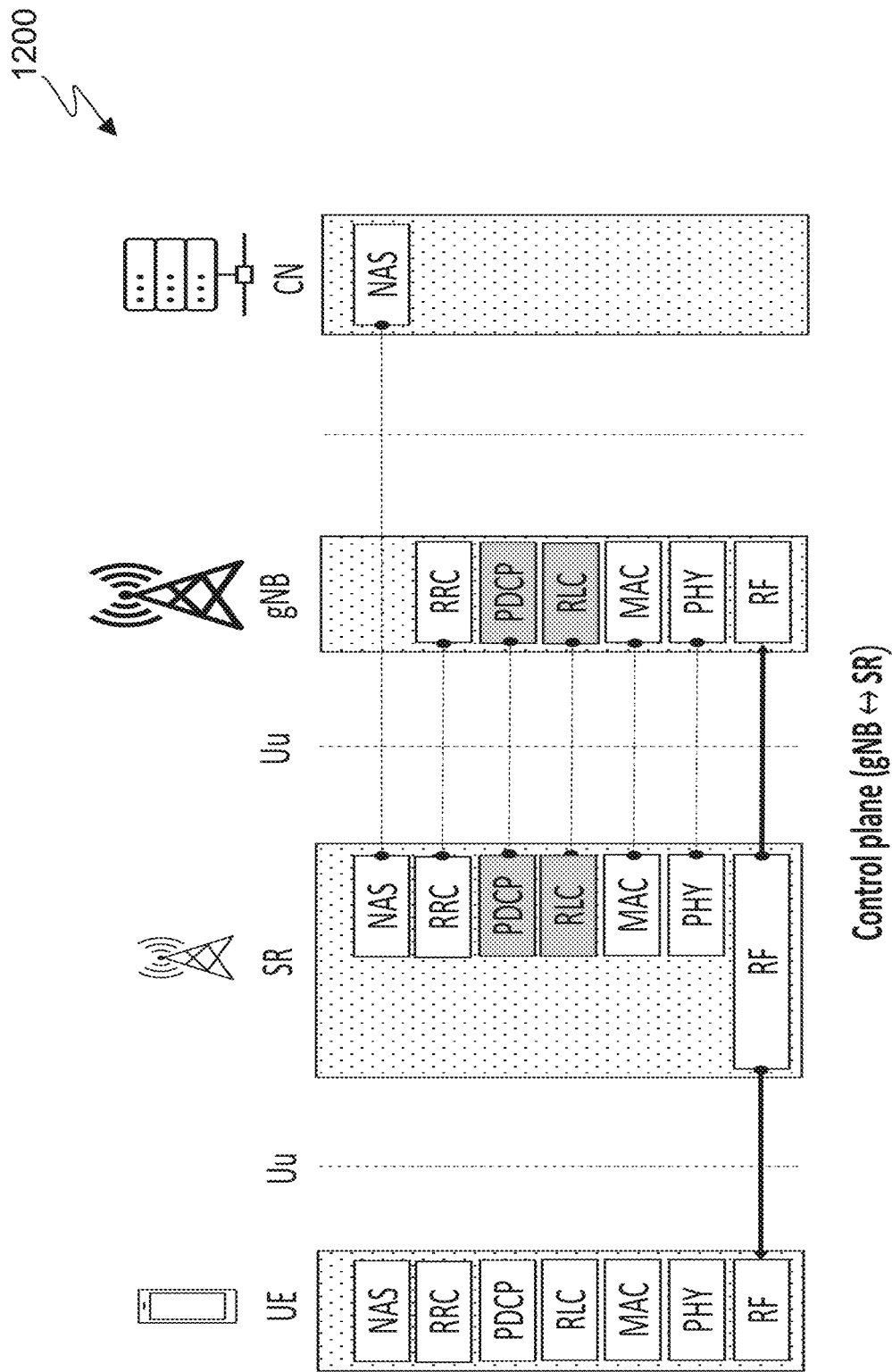
FIG. 12 illustrates an example control plane protocol architecture for smart repeater according to embodiments of the present disclosure.

FIG. 12 illustrates an example control plane protocol architecture for a smart repeater 1200 according to embodiments of the present disclosure. The embodiment of the control plane protocol architecture for the smart repeater 1200 illustrated in FIG. 12 is for illustration only. FIG. 12 does not limit the scope of this disclosure to any particular implementation of the control plane protocol architecture for the smart repeater 1200.

Figure 13:
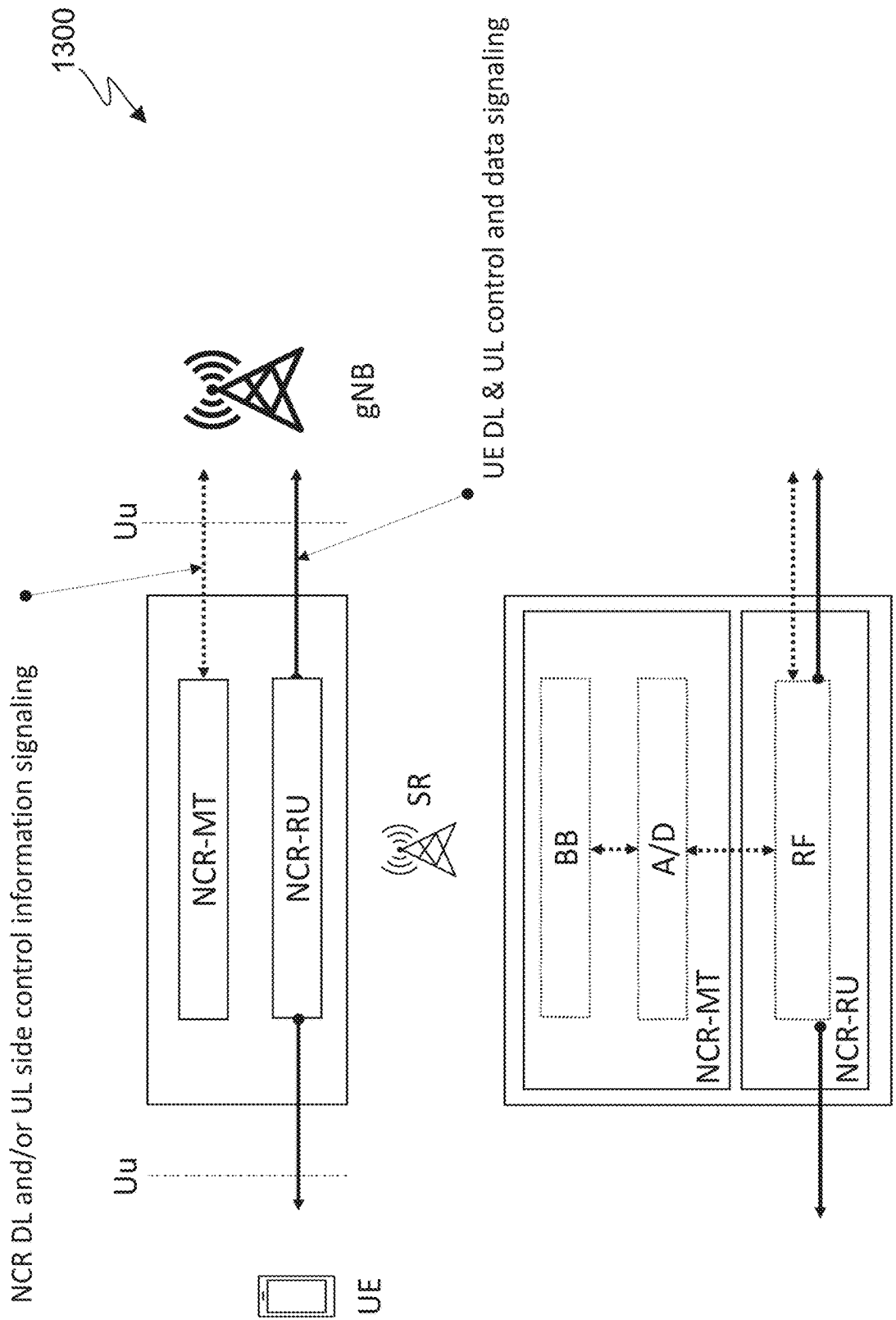
FIG. 13 illustrates an example functional architecture for smart repeater according to embodiments of the present disclosure.

FIG. 13 illustrates an example functional architecture for a smart repeater 1300 according to embodiments of the present disclosure. The embodiment of the functional architecture for the smart repeater 1300 illustrated in FIG. 13 is for illustration only. FIG. 13 does not limit the scope of this disclosure to any particular implementation of the functional architecture for the smart repeater 1300.

FIGS. 11-13 show an example for the functional and protocol architectures of a SR or NCR, such as may be implemented by the TRP 200. In the user plane (FIG. 11), the SR receives the incoming RF signal from the gNB, such as gNB 102, (or the UE, such as UE 116) at its ingress antenna port, then amplifies-and-forwards the RF signal to its egress antenna port to the UE (or gNB). Note that similar to an RF repeater, the amplified-and-forwarded signal traverses the RF path, e.g., is the signal is processed in analog domain. In the control plane (FIG. 12), e.g., when transmitting DL side control information (DL SCI) from the gNB to the SR, or when transmitting UL side control information (UL SCI) from the SR to the gNB, the signal processing by the SR differs. For transmission of DL SCI, the gNB can use one or a combination of signaling options. DL SCI can be transmitted in L1, e.g., by DCI or in any DL control channel, in L2 MAC, e.g., by MAC CE(s) or as part of any DL data channel, in L2 RRC, e.g., by RRC signaling messages and/or IEs. Without loss of generality and illustration purposes, it may be assumed that the SR converts part of the incoming (DL) RF signal from the gNB to digital domain to determine presence and further process the received signaling contents of DL SCI. For transmission of UL SCI to the gNB, it may be assumed that the SR receives the incoming RF signal from the UE at its ingress antenna port, then amplifies-and-forwards the RF signal while adding the UL SCI following its conversion from digital signaling processing to analog domain for transmission at the egress antenna port (FIG. 13). For transmission of UL SCI, the SR can use one or a combination of signaling options. UL SCI can be transmitted in L1, e.g., by an UL control or data channel, in L2 MAC, e.g., by MAC CE(s) or as part of any UL data channel, in L2 RRC, e.g., by RRC signaling messages and/or IEs. Note that the SR may also be configured or provisioned or receive or transmit signaling messages using non-access stratum (NAS) protocol messages, e.g., CM, SM, etc., and/or by O&M signaling. Furthermore, transmission and reception of DL and UL SCI may occur using in-band signaling, e.g., using the same frequency band/channel as the amplified-and-forwarded UE signal(s), or may occur using out-of-band signaling, e.g., SCI is transmitted and received using a different band, channel or frequency range than the amplified-and-forwarded UE signal(s).

Figure 14:
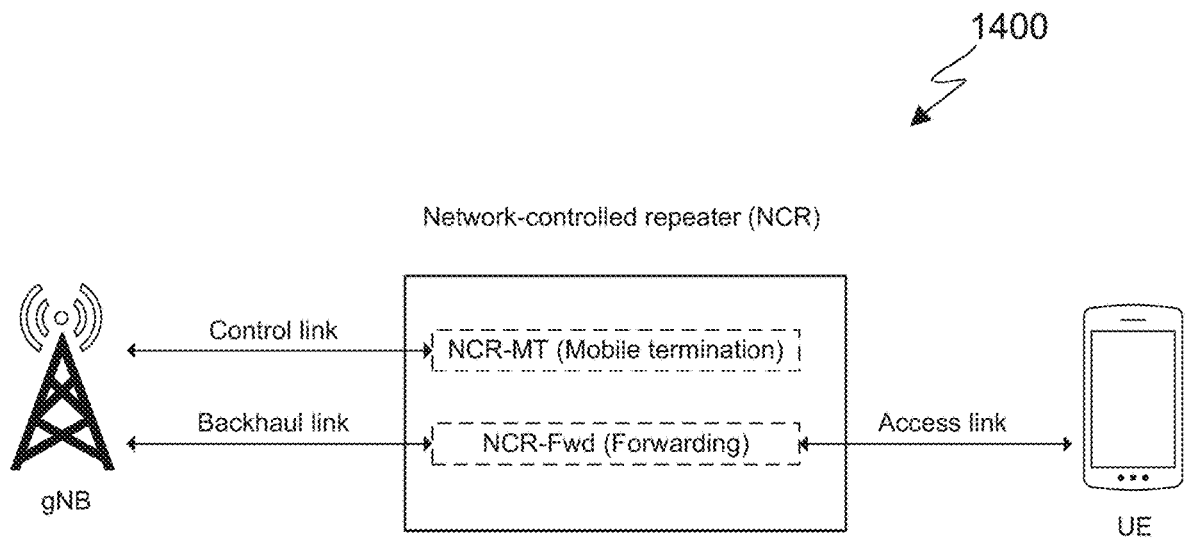
FIG. 14 illustrates an example of a conceptual model or a functional architecture of a network controlled repeater according to embodiments of the present disclosure.

FIG. 14 illustrates an example of a functional architecture of a smart repeater or network controlled repeater 1400 according to embodiments of the present disclosure. The embodiment of the functional architecture of a network controlled repeater 1400 illustrated in FIG. 14 is for illustration only. FIG. 14 does not limit the scope of this disclosure to any particular implementation of the functional architecture of a network controlled repeater 1400.

A network-controlled repeater is an enhancement over conventional RF repeaters with the capability to receive and process side control information from the network/gNB. Side control information could allow a network-controlled repeater to perform the amplify-and-forward operation in a more efficient manner. Potential benefits include mitigation of unnecessary noise amplification, transmissions and receptions with better spatial directivity, and simplified network integration.

As illustrated in FIG. 14, the NCR includes the NCR-MT and NCR-Fwd. The NCR-MT is defined as a functional entity to communicate with a gNB via a Control link (C-link) to enable exchange of control information (e.g., side control information at least for the control of NCR-Fwd). The C-link is based on NR Uu interface.

The NCR-Fwd is defined as a functional entity to perform the amplify-and-forwarding of UL/DL RF signal between gNB and UE via backhaul link and access link. The behaviour of the NCR-Fwd will be controlled according to the received side control information from gNB.

Throughout the present disclosure an NCR-MT is also referred to as SR-MT, an NCR-Fwd is also referred to as SR-RU or NCR-RU, an NCR backhaul link or an NCR control-link (C-link) is also referred to as NCR-to-gNB link, and the NCR access link is also referred to as NCR-to-UE(s) link. These pairs of terms may be used interchangeably.

In some technical realizations, at least one of the NCR-MT's carrier(s) operates in the frequency band forwarded by the NCR-Fwd. NCR-MT and NCR-Fwd operating in a same frequency band is used as reference for the descriptions in the disclosure. In general, an NCR-Fwd may operate with multiple passbands/carriers in same or different frequency band, and a corresponding NCR-MT may operate in one or more passbands/carriers from the multiple passbands/carriers for NCR-Fwd operation in one or more frequency bands. In one example, the NCR-MT may additionally or alternatively operate in carrier(s) outside the frequency bands in which NCR-Fwd operates. Herein, a passband can refer to a frequency range in which a repeater/NCR_Fwd operates in with operational configuration. Such frequency range can correspond to one or several consecutive nominal channels. When an operating frequency for an NCR-Fwd is not consecutive, each subset of channels may be considered as an individual passband. An NCR-Fwd can have one or several passbands.

In some technical realizations, same large-scale properties of the channel, i.e., channel properties in Type-A and Type-D (if applicable) QCL, can be experienced by C-link and backhaul link (at least when the NCR-MT and NCR-Fwd are operating in a same frequency band).

For the transmission/reception of C-link and backhaul link by NCR, signalling on the DL of C-link and DL of backhaul link can be performed simultaneously or in TDM, or the signalling on the UL of C-link and UL of backhaul link can be performed in TDM. The multiplexing may be under the control of gNB with consideration for NCR capability. Simultaneous transmission of the UL of the C-link and the UL of backhaul link may be subject to NCR capability.

Various embodiments, methods, and examples described in the present disclosure can apply beyond NCR/smart repeaters nodes to other nodes with a repeater/relay-like functionality in a wireless network, such as reconfigurable intelligent surfaces (RIS), or to stationary or non-stationary repeater/relay-like nodes in the sky/sea or other not-on-the-ground situations, for example, satellites in non-terrestrial networks (NTN), or mobile repeaters on buses/trains/vessels/ships/aircrafts/drones, and so on.

Throughout the present disclosure, a gNB-to-NCR link is used to refer to one or both of an NCR control link (C-link) or an NCR backhaul link. Throughout the present disclosure, an NCR-to-UE link is used to refer to an NCR access link.

One embodiment includes ON-OFF determination for NCR-Fwd in relation with other indications to NCR. An NCR-Fwd is in ON state in symbols or slots for which the NCR-MT receives, from the gNB, an indication for an ON state or an indication for other operations of NCR-Fwd that imply an ON state or during cell-specific or NCR-specific transmissions or receptions, and the NCR-Fwd is in OFF state for other symbols or slots. Herein, the indication can include one or more of beam indication, such as access beam indication or backhaul beam indication, or link direction (DL/UL) indication, or power control indication, and so on. Herein, the indication can include information of the symbols or slots for which the indication applies, or the NCR-MT can determine symbols or slots for which the indication applies for NCR-Fwd operation based on higher layer configuration or indication, such as OAM configuration or L2/L3 signaling, or predetermined rules, or combination thereof.

In one embodiment, an NCR can receive an indication for ON-OFF separate from other indications for NCR-Fwd operation, wherein the indication can be associated with a set of symbols or slots for which the ON state or OFF state are applicable. Therefore, the NCR-MT can receive an indication for an ON state or OFF state for NCR-Fwd operation in a symbol or slot for which the gNB has not provided an indication, for example, for access beam, or for power control, for link direction (DL/UL), and so on.

For example, the NCR can receive an indication for an ON or OFF state for symbols for which a default or reference beam is applied. For example, the NCR-Fwd is predetermined or configured to operate with a default or reference beam (such as access or backhaul beams) for symbols or slots for which a set of predetermined or pre-configured beams are not indicated. For example, the NCR is indicated access beams {b #1, b #2, . . . , b #N} for sets of symbols or slots {s #1, s #2, . . . , s #N}, respectively, and the NCR is predetermined to operate with a default or reference access beam b #0 for any other symbols or slots other than the sets of symbols or slots {s #1, s #2, . . . , s #N}. In such case, the NCR can be separately indicated an ON state for symbols or slots for which the default or reference access beam #0 is applicable, and the NCR-Fwd is expected to be ON and using access beam b #0, and to be in OFF state otherwise. Alternatively, the NCR can be separately indicated an OFF state for symbols or slots for which the default or reference access beam #0 is not applicable so the NCR-Fwd is expected to be OFF, and to be in ON state using access beam b #0 otherwise.

The above example can apply beyond default or reference beams, and in general for any beams for which an associated time domain indication is not provided. The above example can also apply to power control indication or link direction (DL/UL) indication and so on, wherein the NCR-Fwd needs to operate, for example, with a reference power control or a reference link direction, for which associated time domain resources are not provided.

Herein, a symbol or slot can be with respect to a predetermined or (pre)configured subcarrier spacing, such as an SCS configuration for a PCell of the NCR-MT, or a smallest or largest SCS configuration among all cells associated with the NCR-MT, or a smallest or largest SCS configuration among all cells within passbands of NCR-Fwd, or an SCS value provided along with the corresponding control indication, such as ON-OFF indication or beam indication or power control indication or DL/UL link direction, and so on. In another example, a symbol or slot can be with respect to a reference SCS for each frequency range, such as 30 kHz for FR1 and 120 kHz for FR2.

For example, a separate SCS can be provided for each time domain resource, or for each combination of time domain resources, or for a list of time domain resources that includes a number of time domain resources or a number of combinations of time domain resources. For aperiodic beam indication for NCR access link or for aperiodic ON-OFF indication, an SCS can be provided by the DCI format that provides the aperiodic indication or can be based on an SCS provided by higher layers for the time domain resources indicated in the DCI format.

For example, the NCR-MT can receive ON-OFF indication when beamforming is not applicable to NCR-Fwd operation, such as for operation in FR1.

For example, the NCR-MT can receive ON-OFF indication when other indications for NCR-Fwd operation may be provided very close in time (such as smaller than a threshold) to the NCR-Fwd operation. For example, to avoid frequent switching ON-OFF for the NCR-Fwd or to avoid tight timeline for NCR-Fwd operation, the NCR-Fwd can be indicated ON state before the NCR receives indication for beamforming or power control for link direction and so on. Therefore, the NCR can have sufficient time to "warm up" its circuitry (such as OFF-to-ON transition times in the NCR Mask) before the NCR-Fwd can perform amplify and forward operation. Alternatively, the NCR can determine an ON state for one or more symbols or slots based on an "application time" for a beam indication or power indication or DL/UL link direction, and so on, so that the NCR-Fwd is in ON state by at least the application time (or a fraction thereof) before the NCR-Fwd applies the beam indication or the power indication or the DL/UL link direction, and so on.

For example, an application time such as beam application time or an ON-OFF application time can be based on a slot offset for a corresponding time-domain resource. For example, a time-domain resource provided in a beam indication for NCR-Fwd access link or in an ON-OFF indication for NCR-Fwd can include a slot/symbol offset that is with respect to a periodicity for the beam indication or with respect to a slot/symbol in which the NCR-MT received a signaling for the indication such as a DCI format that include the indication. For example, the NCR-Fwd expects that the slot/symbol offset is not smaller an application time for the corresponding indication.

In another example, an application time for a beam/ON-OFF indication is separate from, such as after, a slot/symbol offset for the time domain resource for the corresponding indication. For example, the NCR-MT first applies the slot/symbol offset with respect to a periodicity for the beam indication or with respect to a slot/symbol in which the NCR-MT received a signaling for the indication such as a DCI format that include the indication, and then applies another offset which is equal to an application time for the corresponding indication. In another example, the two offsets are applied in reverse order, that is, the application time is applied first and the symbol/slot offset for the time domain resource is applied next.

In one example, when a beam indication or an ON-OFF indication includes multiple time domain resources, the UE applies the slot/offset or the application time for the corresponding indication with respect to the first/earliest or last/latest time domain resource, such as a time domain resource with an earliest/latest starting symbol or slot, or a time domain resource with an earliest/latest ending symbol or slot. For example, the NCR applies the application time offset to a slot in which the NCR receives the indication (such as a slot of reception of a PDCCH that provides a DCI format for aperiodic beam indication) to determine a reference slot that applies commonly to the multiple time domain resources, and then the NCR determines each time domain resource based on respective slot offset and/or symbol offset from the reference slot.

For example, the NCR can be provided by ncr-SemiPersistentFwdResourceSetToAddModList a list of sets of resources for transmissions or receptions on the access link and a MAC CE command can indicate a set of resources for the NCR to use or to stop using based on a corresponding identity provided by ncr-SemiPersistentFwdResourceSetId. The NCR uses or stops using the set of resources starting from the first slot that is after slot $k+3N\_slot^{(subframe,\mu)}$ where k is the slot where the NCR-MT would transmit a PUCCH with HARQ-ACK information associated with the PDSCH providing the MAC CE command and is the SCS configuration for the PUCCH transmission. The set of resources is provided by NCR-SemiPersistentFwdResourceSet and occurs with a periodicity provided by ncr-periodicity. A resource from the set of resources is provided by NCR-SemiPersistentFwdResource and includes a pair of a time resource provided by ncr-PeriodicTimeResource and a beam with an index provided by ncr-beamIndex and can be updated by the MAC CE command. The time resource starts at a slot that is offset by slotOffsetSemiPersistent slots from the start of the period for the set of resources and at a symbol that is offset by symbolOffset from the start of the slot, and has a duration provided by durationInSymbols for a SCS provided by ncr-referenceSCS.

For example, the NCR-MT can be configured to monitor PDCCH according to USS sets for detection of a DCI format 5_0 for aperiodic beam indication with CRC scrambled by an NCR-RNTI. The DCI format 5_0 includes pairs of fields where a pair of fields indicates a time resource and an index of a beam for transmissions or receptions on the access link. The time resource is indicated by a value of a first field in the pair of fields. The index of the beam is indicated by a value of a second field in the pair of fields. The time resource starts at a slot that is offset by slotOffsetAperiodic slots from a reference slot and at a symbol that is offset by symbolOffset from the start of the slot, and has a duration provided by durationInSymbols for a SCS provided by ncr-referenceSCS. The reference slot is a slot that is after a slot n of a PDCCH reception that provides the DCI format 5_0 by a number of slots indicated by an offset k application time, that is, the reference slot is slot n+k.

In one example, when the NCR receives a PDCCH providing a DCI format 5_0 for aperiodic beam indication according to a first SCS, so a reference slot n+k is according to the first SCS, and a time resource, from the time resources indicated by the DCI format 5_0, is configured a slot offset s according to a second SCS, such that the second SCS is smaller than the first SCS, the NCR determines the time resource to be s slots, in the second SCS, after a first/earliest slot, in the first SCS, that is after slot n+k. For example, the NCR applies this method when slot n+k is not a first slot, among multiple slots in the second SCS, that overlap with a slot in the first SCS. In another example, the NCR determines the time resource to be s slots, in the second SCS, after slot n+k. For example, the NCR applies this method when slot n+k is a first slot, among multiple slots in the second SCS, that overlap with a slot in the first SCS.

In one example, the UE determines a reference slot for determination of time resources (such as slot n+k or a first/earliest slot, in the first SCS, that is after slot n+k) separately for each time resource indicated in a DCI format 5_0 for aperiodic beam indication.

In another example, the UE determines a same reference slot for multiple time resources indicated in a DCI format 5_0 for aperiodic beam indication. For example, when:
- a DCI format 5_0 for aperiodic beam indication indicates a first time resources (for example, associated with a SCS #1) and second time resources (for example, associated with a SCS #2), and
- the NCR would determine a first reference slot for the first time resource (e.g., slot n+k as the first reference slot), and
- the UE would determine a second reference slot for the second time resource (e.g., a first/earliest slot, in the first SCS (i.e., SCS of PDCCH), that is after slot n+k as the second reference slot), the UE determines a common reference slot for the first and the second time resources to be a latest (or an earliest) one among the first reference slot and the second reference slot.

Similar method applies for a semi-persistent beam indication provided by a MAC-CE, wherein the NCR determines a reference/activation slot for the MAC-CE to be the first slot that is after slot $k+3N_{slot}^{subframe,\mu}$ according to a first SCS, and the time resources activated by the MAC-CE are configured or indicated according to a second SCS. For example, the NCR determines a starting periodicity for using the time resources activated by the MAC-CE based on one or more of the methods described above.

In one example, the above methods for determination of reference slot applies when an indication by a DCI format or a MAC-CE is provided for other NCR side control information, such as for ON-OFF indication or for power control or for TDD UL/DL information.

For example, the NCR can receive an ON-OFF indication when the gNB intends to override a previous indication for ON-OFF or a previous indication for other purposes, such as for beam indication or power indication or DL/UL link direction, and so on. For example, the NCR can receive a second dynamic ON-OFF indication (e.g., via a DCI or MAC-CE) for a symbol or slot for which the NCR already received a first semi-static indication (e.g., via RRC or OAM) that is associated with the symbol or slot and indicates an ON-OFF state or an access/backhaul beam or a DL/UL link direction, and so on. In such case, the NCR interprets the first indication based on the second indication. For example, when the second indication provides an OFF state for the symbol or slot, the second indication overrides the first indication, and the NCR-Fwd goes to the OFF state or not forwarding, regardless of the information provided by the first indication for the symbol or slot.

Figure 15:
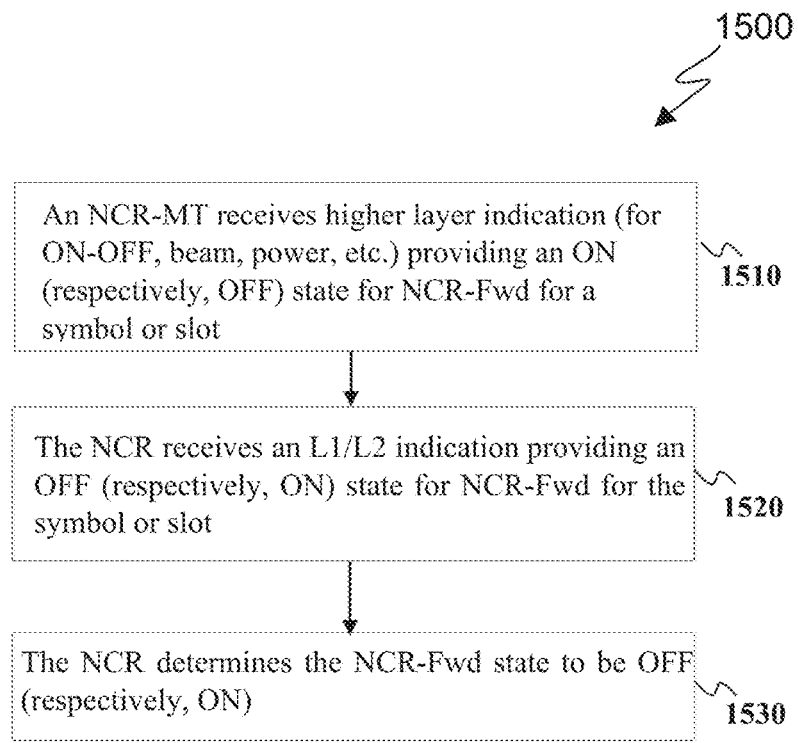
FIG. 15 illustrates an example flowchart for overriding the higher layer indication ON-OFF state of NCR-Fwd by an L1/L2 indication providing a different ON-OFF state according to embodiments of the present disclosure.

FIG. 15 illustrates an example flowchart for overriding the higher layer indication ON-OFF state of NCR-Fwd by an L1/L2 indication providing a different ON-OFF state 1500 according to embodiments of the present disclosure. The embodiment of the flowchart for overriding the higher layer indication ON-OFF state of NCR-Fwd by an L1/L2 indication providing a different ON-OFF state 1500 illustrated in FIG. 15 is for illustration only. FIG. 15 does not limit the scope of this disclosure to any particular implementation of the flowchart for overriding the higher layer indication ON-OFF state of NCR-Fwd by an L1/L2 indication providing a different ON-OFF state 1500.

As illustrated in FIG. 15, at step 1510, an NCR-MT receives higher layer indication (for ON-OFF, beam, power, etc.) providing an ON (respectively, OFF) state for NCR-Fwd for a symbol or slot. At step 1520, the NCR receives an L1/L2 indication providing an OFF (respectively, ON) state for NCR-Fwd for the symbol or slot. At step 1530, the NCR determines the NCR-Fwd state to be OFF (respectively, ON).

For example, ON-OFF indication can correspond to certain scenarios in NCR operation. For example, the NCR can receive an indication of OFF state for night-mode/night-time operation, in which few or no UEs are considered to be served by the NCR, so NCR-Fwd can be switched to the OFF state. For example, such indication can be a semi-static indication provided by higher layers.

For example, the NCR-MT can determine ON-OFF state for NCR-Fwd operation based on predetermined rules. For example, the NCR-Fwd can be expected, per the specifications for system operation, to be ON during cell-specific transmissions, such as symbols/slots associated with SSB transmission or PRACH transmission or PDCCH monitoring occasions corresponding to system information (SI) according to Search Space Set #0, or NCR-specific SI according to an associated CORESET and search space set, paging, and so on.

An ON-OFF indication can be provided by higher layers such as OAM or RRC, or can be provided by L1/L2 signaling such as a DCI format or a MAC-CE command.

An ON-OFF indication can be associated with a set of symbols or slots or a pattern of symbols or slots or a "state" of symbols of slots. For example, the set of symbols or slots can include indication of symbol indexes or slot indexes. For example, the pattern of symbols or slots can include information of a starting symbol or slot, or a corresponding shift value for a (starting) symbol or slot, a periodicity for the symbol/slot pattern, a first number of ON symbols/slots followed by a number of OFF symbols/slot or vice versa, and so on. For example, the "state"/list of symbols or slots can be from a predetermined or (pre)configured set of states/lists of symbols or slots, wherein each state/list of symbols or slots can be a set of symbols/slots for ON-OFF signaling or a pattern of symbols/slots for ON-OFF signaling, as described above, or a combination thereof. The set of states/lists of symbols/slots can be provided by the specifications for system operation or by higher layer signaling such as by NCR-specific system information or by OAM or by RRC configuration. In one example, an ON-OFF indication may not include an ON state, and include only OFF states. Therefore, a corresponding signaling can include only a state/list or pattern of symbols or slots, without indication of ON or OFF state, since the signaling is presumed to refer to OFF state only. Herein, signaling can include semi-static signaling, for example, by higher layer configuration such as OAM signaling or by SIB signaling, or by RRC signaling, or dynamic or L1/L2 signaling, such as by a MAC-CE or a DCI.

One embodiment includes semi-static ON-OFF indication for NCR. An NCR receives a higher layer indication providing ON-OFF information for NCR-Fwd operation for symbols or slots. The higher layer ON-OFF indication can be consistent with cell-specific or NCR-specific transmission or receptions and can include other time/frequency resources per NCR operation conditions. The NCR can be additionally provided a Standby (or Flexible) state in which the NCR ON-OFF states is pending and can be determined based on subsequent L1/L2 signaling.

In one realization, an NCR is, by default, in ON state during a cell-specific or NCR-specific transmissions or receptions. Accordingly, the NCR determines the NCR-Fwd to be in ON state during symbols/slots associated with cell-specific or NCR-specific transmission/receptions. For example, the NCR need not receive any indication from the gNB to be ON during such symbols/slots.

For example, when NCR receives ON-OFF indication from higher layers, the NCR expects that the higher layer indication for ON-OFF is consistent with cell-specific or NCR-specific transmissions. For example, the NCR expects that the higher layer indication for ON-OFF does not indicate an OFF state for symbols/slots associated with cell-specific or NCR-specific transmissions. For example, the higher layer indication for ON-OFF does not indicate any value (ON or OFF) for symbols/slots associated with cell-specific or NCR-specific transmissions.

In one realization, the NCR is provided with an SMTC configuration by the gNB. An SMTC configuration may be associated with a configurable or a default ON-OFF transmission/reception behavior of the NCR-MT or NCR-Fwd.

An SMTC configuration can be indicated to the NCR using higher layer signaling, e.g., OAM or RRC, or L1/L2 signaling, such as DCI or MAC-CE based signaling. An SMTC configuration may be associated with symbol(s) or slot(s). An NCR may acquire an SMTC configuration from DL NCI signaling received over the control link or may acquire an SMTC configuration from signaling received over the backhaul link.

In one example, an SMTC configuration provided to the NCR is associated with ON state of the NCR-Fwd, e.g., the NCR amplifies & forwards received signals on the DL backhaul link and re-transmits these on the DL access link towards the UEs. This approach is advantageous to ensure that DL measurement signals transmitted by the gNB for RRM measurements of UEs are always amplified and forwarded by the NCR independent of other ON-OFF settings or NCR behavior which the gNB may configure. The SMTC configurations provided by the gNB to the NCR and to the UEs, respectively, may be the same. For example, the gNB may use an SMTC configuration indicating SSB #1 and SSB #2 for which ON state is the default or the configurable behavior. The NCR then considers the DL symbols corresponding to SSB #1 and SSB #2 in ON state. Other SSBs such as SSB #3, SSB #4, and so forth not indicated by the SMTC configuration provided to the NCR may apply a different configurable or default behavior, e.g., OFF state unless explicitly configured for ON state. UEs including those connected to the gNB through the NCR may be provided with the same SMTC configuration for their RRSP or RSSI measurements in RRC_IDLE or RRC_CONNECTED modes.

In another example, an SMTC configuration provided to the NCR is associated with OFF state of the NCR-Fwd, e.g., the NCR does not amplify & forward received signals on the DL backhaul link and does not re-transmit these on the DL access link towards the UEs. This approach is advantageous to ensure that DL measurement signals transmitted by the gNB for RRM measurements of NCRs are received without incurring self-interference or signal pollution from amplification and forwarding operation by the NCR for RRM measurements of the gNBs signal using the NCR-Fwd or NCR control links. The SMTC configurations provided by the gNB to the NCR and the UEs, respectively, may be different. For example, the gNB may use a first SMTC configuration indicating SSB #1 and SSB #2 for which ON state is the default or the configurable behavior to both NCR and UEs. The NCR then considers the DL symbols corresponding to SSB #1 and SSB #2 in ON state. UEs including those connected to the gNB through the NCR may be provided with the same first SMTC configuration for their RRSP or RSSI measurements in RRC_IDLE or RRC_CONNECTED modes. The gNB configures a second SMTC configuration indicating SSB #3, SSB #4 to the NCR for which OFF state is the default or configurable behavior. The NCR may perform RRM or L1 measurement in the corresponding time-domain resources for establishing or maintaining connectivity to the gNB, for assessing link quality of the backhaul or control link and so forth. Other SSBs not indicated either by the first or the second SMTC configurations provided to the NCR may apply a different configurable or default behavior, e.g., OFF state unless explicitly configured for ON state.

Herein, the NCR determines cells for which cell-specific transmissions/receptions are used to determine a default ON states, based on, for example:
  a cell, such as a primary cell, or set of cells corresponding to NCR-MT, or
  a cell or set of cells corresponding to the passbands in which NCR-Fwd performs the amplify and forward operation.

Herein, NCR-specific transmissions can correspond to NCR-specific system information or any dedicated transmission/reception for NCR-MT, such as SPS PDSCH or configured grant PUSCH for exchange of control information between NCR and the gNB.

In another realization, NCR-MT can receive indication from the gNB to go to OFF state even in symbols or slots corresponding to cell-specific or NCR-specific transmissions or receptions. In one example, such indication can be only from L1/L2 such as a DCI format or a MAC CE command providing ON-OFF indication, and not expected to be from higher layers such as OAM or RRC signaling. In another example, higher layer indication can also include ON-OFF information (such as OFF indication) symbols or slots corresponding to cell-specific or NCR-specific transmissions or receptions.

Figure 16:
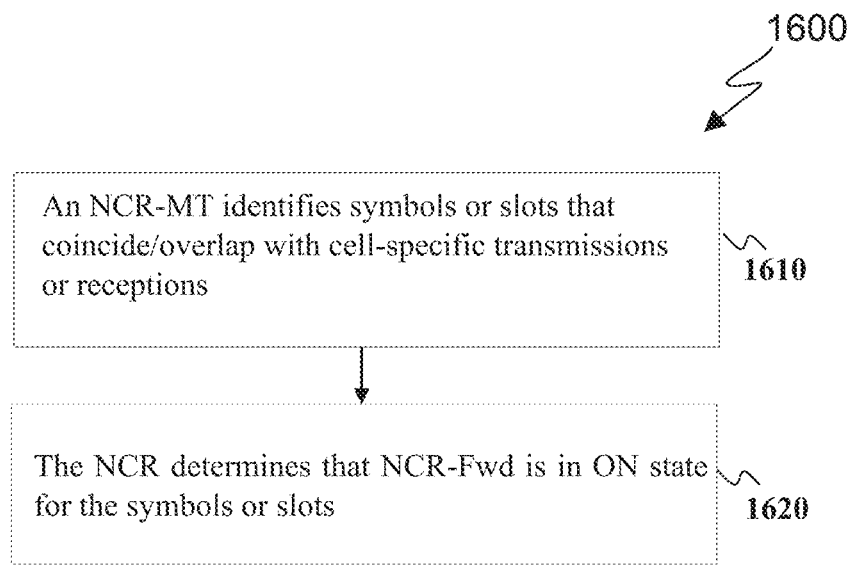
FIG. 16 illustrates an example flowchart for default ON-OFF behavior of NCRs during cell-specific transmission or receptions according to embodiments of the present disclosure.

FIG. 16 illustrates an example flowchart for default ON-OFF behavior of NCRs during cell-specific transmission or receptions 1600 according to embodiments of the present disclosure. The embodiment of the flowchart for default ON-OFF behavior of NCRs during cell-specific transmission or receptions 1600 illustrated in FIG. 16 is for illustration only. FIG. 16 does not limit the scope of this disclosure to any particular implementation of the flowchart for default ON-OFF behavior of NCRs during cell-specific transmission or receptions 1600.

As illustrated in FIG. 16, at step 1610, an NCR-MT identifies symbols or slots that coincide/overlap with cell-specific transmissions or receptions. At step 1620, the NCR determines that NCR-Fwd is (by default) in ON state for the symbols or slots.

In one realization, the NCR expects that higher layer indication of ON-OFF to be consistent with other higher layer indications for an NCR, such as higher layer beam indication, or power control indication, or DL/UL link direction, and so on. For example, the NCR does not expect to receive higher layer indication of OFF state for symbols/slots for which the NCR has already received higher layer indication for access/backhaul beams or for power control parameters for NCR-Fwd operation.

In another realization, the NCR need not (or does not expects to) receive any higher layer ON-OFF indication for symbols/slots for which the NCR has received other higher layer indication for operation of NCR-Fwd, such as indication of access/backhaul beam or power control parameters, and so on.

In yet another realization, the NCR can receive higher layer ON-OFF indication for symbols/slots for which the NCR has already received higher layer indication for other NCR control information, such as for indication of access/backhaul beams or for power control parameters or for TDD DL/UL link direction for NCR-Fwd operation. For example, to simplify the signaling, a higher layer indication for such other NCR control information can be based on repeated patterns of symbols or slots, while the NCR can receive "irregular" lists of symbols or slots for which the NCR-Fwd is expected to be OFF.

In one embodiment, a higher layer indication for ON-OFF can include a "flexible" or "stand-by" state, wherein the NCR-Fwd state may be ON or OFF based on later gNB indications, such as later L1/L2 signaling from the gNB, or based on predetermined rules. For example, higher layer indication of ON-OFF for an NCR can include {ON, OFF, Flexible/Standby} states, and each symbol/slot or groups or sets or patterns of symbols or slots correspond to one of the above states. Such Flexible/Standby state can be beneficial, for example, when there is uncertainty about UE presence or activity or mobility in coverage area of the NCR, or corresponding data traffic situation, so gNB may not indicate an ON or OFF state for some symbols or slots, rather indicate a Flexible/Standby state, so that a final decision/indication on the ON or OFF state can be provided subsequently.

For example, when a symbol or slot is indicated by higher layers to be in Flexible/Standby state, and the NCR receives a subsequent L1/L2 signaling associated with the symbol/slot, such as:
  a DCI format or MAC-CE command for ON-OFF indication that indicates an ON state, or
  a DCI format or MAC-CE command for indication of access/backhaul beam or for indication of power control parameters or for indication of UL/DL link direction (such as for a flexible symbol),
for NCR-Fwd operation in the symbol or slot, the NCR determines that the NCR-Fwd is in ON state during that symbol or slot. For example, when a symbol or slot is indicated by higher layers to be in Flexible/Standby state, and the NCR receives a subsequent L1/L2 signaling a DCI format or MAC-CE command for ON-OFF indication that indicates an OFF state for the symbol or slot, the NCR determines that NCR-Fwd is OFF during the symbol or slot. For example, if the NCR does not receive any later L1/L2 signaling associated with the symbol or slot, the NCR determines that NCR-Fwd is in OFF states during the symbol or slot.

In one realization, higher layer indication does not include a Flexible/Standby state, and a similar indefinite state can be indicated to the NCR by not providing ON or OFF for a symbol or slot. For example, higher layer indication provides ON for a first set of symbols or slots, and OFF for a second set of set of symbols or slots, and no indication for any remaining symbols or slots (i.e., other than the first and second sets of symbols or slots). For the latter symbols or slots, the NCR determines whether the NCR-Fwd in ON or OFF based on later L1/L2 signaling for NCR-Fwd operation.

Figure 17:
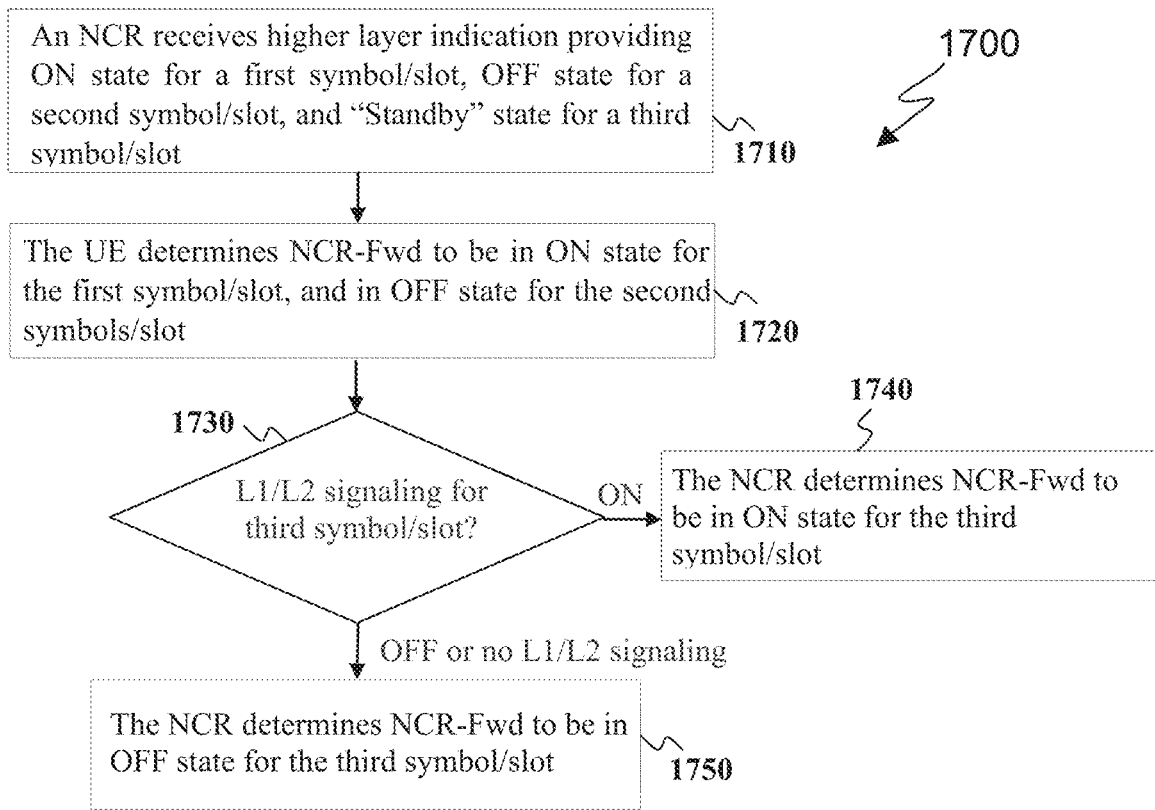
FIG. 17 illustrates an example flowchart for operation with "Standby" state for NCR according to embodiments of the present disclosure.

FIG. 17 illustrates an example flowchart for operation with "Standby" state for NCR 1700 according to embodiments of the present disclosure. The embodiment of the flowchart for operation with "Standby" state for NCR 1700 illustrated in FIG. 17 is for illustration only. FIG. 17 does not limit the scope of this disclosure to any particular implementation of the flowchart for operation with "Standby" state for NCR 1700.

As illustrated in FIG. 17, at step 1710, an NCR receives higher layer indication providing ON state for a first symbol/slot, OFF state for a second symbol/slot, and "Standby" state for a third symbol/slot. At step 1720, the UE determines NCR-Fwd to be in ON state for the first symbol/slot, and in OFF state for the second symbols/slot. At step 1730, the UE determines whether the UE has received L1/L2 signaling for the third symbol/slot. At step 1740, when the NCR-MT receives an L1/L2 signaling providing an ON state for the third symbol/slot, the NCR determines NCR-Fwd to be in ON state for the third symbol/slot. At step 1750, when the NCR-MT receives an L1/L2 signaling providing an OFF state for the third symbol/slot or when the NCR-MT does not receive any L1/L2 signaling for the third symbol/slot, the NCR determines NCR-Fwd to be in OFF state for the third symbol/slot.

One embodiment includes dynamic ON-OFF indication for NCR. An NCR can receive L1/L2 signaling for ON-OFF indication, that provide ON-OFF information consistent with higher layer ON-OFF indication, or that can override ON-OFF information provided by higher layers. The L1/L2 signaling can also override cell-specific transmissions (such as SSB, PRACH, PDCCH for system information, paging, etc.).

In one example, an L1/L2 signaling for ON-OFF includes only an OFF state, and does not include an ON state, since ON state can be inferred from signaling of other NCR control information. In another example, an L1/L2 signaling for ON-OFF can include both ON and OFF states for different time/frequency resources.

In one realization, the NCR-MT receives L1/L2 indication of ON-OFF only for symbols or slots for which the NCR-MT has not received any higher layer indication for ON-OFF, or for other NCR control indication that implies an ON (or OFF) state, such as access/backhaul beam indication or power control indication or DL/UL link direction indication and so on. For example, the NCR does not expect that L1/L2 indication of ON-OFF overrides any higher layer indication that provides or determines ON or OFF state for a symbol or slot.

In another realization, the NCR-MT can receive L1/L2 indication of ON-OFF also for symbols or slots for which the NCR-MT has already received a higher layer indication that provides or determines an ON or OFF state for the NCR. In such case, L1/L2 indication for ON-OFF can override corresponding higher layer indications. For example, when an NCR receives a higher layer indication providing or determining an ON state for a symbol or slot, and the NCR receives an L1/L2 indications that indicates an OFF state for the symbol or slot, the NCR determines that the NCR-Fwd is in OFF state during the symbol or slot (that is, the higher layer ON indication is overridden).

In one example, L1/L2 indication for ON/OFF can extend a higher layer indication for ON/OFF. For example, when NCR-MT receives higher layer indication for ON/OFF in terms of, for example, a discontinuous reception (DRX) or discontinuous transmission (DTX) or discontinuous forwarding (DF) or combinations/variations thereof, for operation of NCR-Fwd, and when the NCR-MT receives an L1/L2 indication for ON/OFF, the L1/L2 indication for ON/OFF can extend the "ON duration" (or "OFF duration" or "active duration") for NCR-Fwd operation. For example, when higher layer ON/OFF indication provides an ON duration for DRX/DTX/DF (for example, based on an ON timer) for the NCR-Fwd operation, and the NCR receives a dynamic ON/OFF indication while the ON timer is running, the ON timer is reset/restarted, so that the ON duration is extended.

In one realization, an NCR expects that L1/L2 indication of ON/OFF is consistent with L1/L2 indication for other NCR control information, such as for access/backhaul beam indication, power control indication, DL/UL link direction, and so on. In one example, the NCR does not expect to receive L1/L2 indication providing an OFF state for a symbol/slot or a set of symbols/slots for which the NCR has already received another L1/L2 for other NCR control information. For example, the NCR expects to be ON (without any indication) for the symbol/slot or the set of symbols/slots for which the NCR has received an L1/L2 beam indication or power control indication and so on.

In one realization, an L1/L2 indication for ON/OFF can override an L1/L2 indication for another NCR control information, such as beam or power or link direction and so on. For example, the NCR-MT can receive a first L1/L2 indication, for example, for access/backhaul beam indication or power NCR-Fwd control parameter indication or DL/UL link direction, and so on, for a symbol/slot or a set of symbols or slots (implying that the NCR-Fwd is ON during the symbol/slot or the set of symbols/slots). Then, the UE can receive a second L1/L2 indication for ON/OFF providing an OFF state for the symbol/slot for symbols/slots from the set of symbols/slot, therefore, overriding the first indication. Such behavior can be similar to pre-emption indication or cancellation indication for UEs.

In one realization, an NCR does not expect that L1/L2 indication can override cell-specific or NCR-specific transmissions. For example, the NCR does not expect to receive an L1/L2 indication providing an OFF state for a symbol/slot or a set of symbols/slots that coincide or overlap with a cell-specific or NCR-specific transmissions or receptions, as previously described.

For example, the gNB is communicating with some UEs via the NCR, such as a UE #1 with eMBB traffic and a UE #2 with URLLC traffic. For example, the gNB schedules UE #2 in first time/frequency resources for a first PDSCH reception or a first PUSCH transmission. However, the gNB determines that UE #2 has a high-priority traffic, and determines to schedule UE #2 for a second PDSCH reception or a second PUSCH transmission in second time/frequency resource that overlap with the first time/frequency resources. Accordingly, the gNB sends to UE #1 a DL pre-emption indication via DCI format 2_1 or an UL cancellation indication via DCI format 2_4 to stop the first PDSCH reception or the first PUSCH transmission to accommodate the second PDSCH reception or the second PUSCH transmission that has higher priority.

For example, when both UE #1 and UE #2 are communicating with the gNB via the NCR, the gNB needs to inform the NCR about the updated scheduling:

For example, when the NCR-Fwd serves UE #1 and UE #2 using two different access beams, the gNB can send a new aperiodic access beam indication (corresponding to a second beam for UE #e) to the NCR-MT to override a previous aperiodic access beam indication (corresponding to a first beam for UE #1);

For example, when the first and second time/frequency resources corresponding to UE #1 and UE #2 are not fully aligned (such as, fewer symbols for URLLC traffic of UE #2 compared to a number of symbols for eMBB traffic of UE #1), the gNB can send a dynamic/ aperiodic OFF indication to the NCR-MT to override a previous aperiodic beam indication (corresponding to a first beam for UE #1), and stop the NCR-Fwd from forwarding on non-overlapping part/symbols/slots of the first and second time/frequency resources.

For example, some of the examples above can continue to hold when the NCR serves only one the two UEs, such as only UE #1. For example, the gNB can send a dynamic/ aperiodic OFF indication to the NCR-MT on a third time/ frequency resource to override a previous aperiodic beam indication (corresponding to a first beam for UE #1), and stop the NCR-Fwd from forwarding on non-overlapping part/symbols/slots of the first and third time/frequency resources. For example, the third time/frequency resource can be same as or different from (such as a subset or a superset of) the second time/frequency resource.

For example, a second/later aperiodic beam indication for NCR-Fwd access link can override a first/previous aperiodic beam indication for the NCR access link in overlapping time/frequency resources for the first and second aperiodic beam indications.

For example, a dynamic/aperiodic OFF indication for NCR-Fwd can override a previous aperiodic beam indication for NCR-Fwd access link in overlapping time/frequency resources for the two indications (that is, the OFF indication and the beam indication).

In another realization, the NCR can receive an L1/L2 indication providing an OFF state for a symbol/slot or a set of symbols/slots that coincide or overlap with a cell-specific or NCR-specific transmission or reception (therefore, overriding such transmission or receptions). Such behavior can be beneficial, for example, for interference management when the gNB determines that there may be few or no UEs in the coverage area of NCR, so cell-specific or NCR-specific transmissions or receptions can be avoided. In some scenarios, there may be some UEs in the coverage area of NCR, but the gNB can still deem it beneficial to turn off the NCR, so the L1/L2 indication for ON/OFF can be used.

Figures 18, 19:
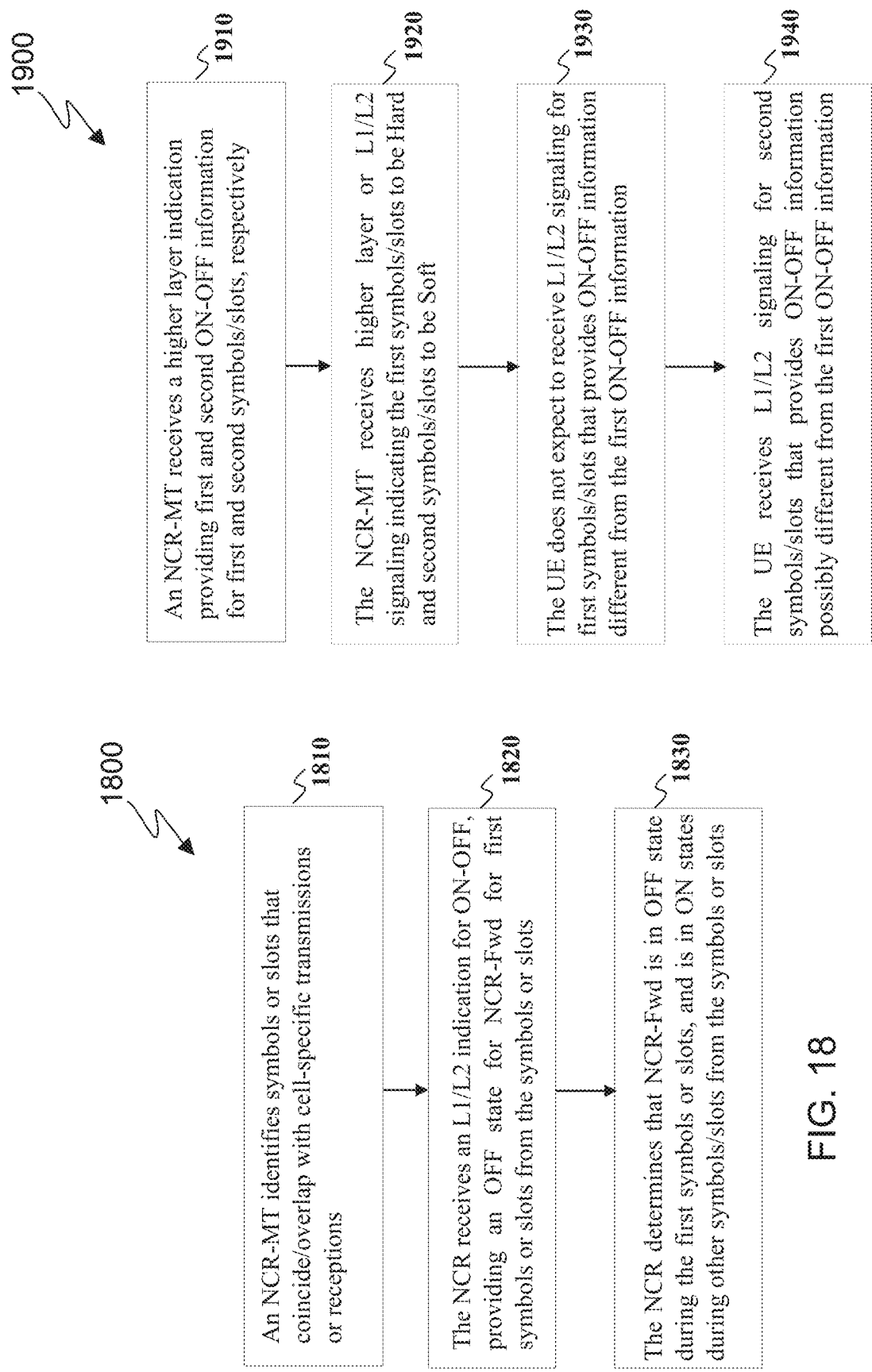
FIG. 18 illustrates an example flowchart for application of L1/L2 signalling for cell-specific transmissions or receptions according to embodiments of the present disclosure.
FIG. 19 illustrates an example flowchart for application of Hard and Soft resource status values for ON-OFF indication according to embodiments of the present disclosure.

FIG. 18 illustrates an example flowchart for application of L1/L2 signalling for cell-specific transmissions or receptions 1800 according to embodiments of the present disclosure. The embodiment of the flowchart for application of L1/L2 signalling for cell-specific transmissions or receptions 1800 illustrated in FIG. 18 is for illustration only. FIG. 18 does not limit the scope of this disclosure to any particular implementation of the flowchart for application of L1/L2 signalling for cell-specific transmissions or receptions 1800.

As illustrated in FIG. 18, at step 1810, an NCR-MT identifies symbols or slots that coincide/overlap with cell-specific transmissions or receptions. At step 1820, the NCR receives an L1/L2 indication for ON-OFF, providing an OFF state for NCR-Fwd for first symbols or slots from the symbols or slots. At step 1830, the NCR determines that NCR-Fwd is in OFF state during the first symbols or slots, and is in ON states during other symbols/slots from the symbols or slots.

One embodiment includes application of Hard/Soft/Not Available for ON-OFF indication. An NCR can receive 'resource status' indication from a set of values, such as {Hard, Soft, Not Available}, for symbols or slots, and the NCR determines whether or not an L1/L2 signaling for ON-OFF (or for other NCR control information providing ON-OFF state) can override higher layer indication for ON-OFF (or for other NCR control information providing an ON-OFF state) for the symbols or slots based on the resource status indication associated with the symbols or slots. For example, a "resource status" may be referred to as a priority level or a priority flag for the resource, such as high priority or low priority, or a priority level index such as a priority level index 0 that is in a lower (or higher) priority than a priority level index 1. For example, the NCR can receive a 'resource status' indication or a priority level/flag for an L2 signaling, such as semi-persistent beam indication or ON-OFF indication, for the symbols or slots of a resource (set/list) to indicate whether to not an L1 signaling, such as aperiodic beam indication or ON-OFF indication, can override the L2/semi-persistent indication for the symbols or slots of a resource (set/list).

In one realization, when a resource status is indicated to be Hard or when a higher layer indication is associated with a Hard status, the NCR does not expect to receive an L1/L2 signaling that overrides the ON-OFF state provided by the higher layer indication for the associated symbols or slots. Similar holds when an L2/semi-persistent indication is associated with a Hard status, that can override the indication provided by L1/aperiodic indication for the associated symbols or slots. For example, a "Hard" resource status may be referred to as a high(er) priority resource or may have a larger (or smaller) priority level index.

In one realization, when a resource status is indicated to be Soft or when a higher layer indication is associated with a Soft status, the NCR can receive an L1/L2 signaling that overrides the ON-OFF state provided by the higher layer indication for the associated symbols or slots. Similar holds when an L2/semi-persistent indication is associated with a Soft status, that is overridden by an indication provided by L1/aperiodic indication for the associated symbols or slots. When the UE does not receive an L1/L2 indication for such a Soft resource, the NCR applies the ON-OFF state provided by higher layer indication. For example, a "soft" resource status may be referred to as a low(er) priority resource or may have a smaller (or larger) priority level index.

In one example, indication of resource status such as Hard or Soft or Not Available (H/S/N) can be based on higher layer indication or based on L1/L2 signaling. For example, the resource status H/S/N indication can be provided separately for each symbol or slots, or can be provided jointly for a number of symbols or slots. For example, the NCR can receive H/S/N indication jointly for all symbols in a slot, such as a first H/S/N value for DL symbols of a slot and a second H/S/N value for UL symbols of a slot. For example, the NCR can receive a first H/S/N value for DL slots from a slot pattern and a second H/S/N value for UL slots from the slot pattern. The NCR can receive an indication of H/S/N in an NCR-group-common search space set and using a group-common DCI, wherein a first position in DCI corresponds to a first NCR and a second position in the DCI corresponds to a second NCR. For example, indication of H/S/N can be provided by a MAC-CE command or a DCI format. For example, indication of H/S/N can be provided by (pre) configuration such as OAM signaling or SIB signaling, or by higher layer configuration such as RRC signaling.

For example, an indication of resource status, such as Hard/Soft/Not-Available or a priority level/flag can be provided separately for each time/frequency resource or can be provided for each combination of time/frequency resources, wherein a combination of time/frequency resources include multiple time/frequency resources, or can be provided for a list of time/frequency resources that includes a number of time/frequency resources or a number of combinations of time/frequency resources.

For example, when an NCR receives a resource status of 'Hard' or priority level/flag 'True' is provided for a higher-layer ON-OFF indication or beam indication, such as periodic beam indication, for a first resource or a first set/list of resources, and NCR receives an L1/L2 signaling for ON-OFF indication or for beam indication, such as an aperiodic or semi-persistent beam indication (without a resource status of 'Hard' or a priority level/flag 'True'), for a second resource or a second set/list of resources, the higher-layer/periodic indication overrides the L1/L2 indication in symbols (or slots) wherein the first resource or the first set/list of resources overlap with the second resource or the second set/list of resources.

For example, when an NCR receives a resource status of 'Hard' or priority level/flag 'True' is provided for an L2/semi-persistent indication provided by a MAC-CE for ON-OFF indication or beam indication, such as semi-persistent beam indication, for a first resource or a first set/list of resources, and NCR receives an L1/aperiodic signaling for ON-OFF indication or for beam indication, such as an aperiodic beam indication, for a second resource or a second set/list of resources, the L2/semi-persistent indication overrides the L1/aperiodic indication in symbols (or slots) wherein the first resource or the first set/list of resources overlap with the second resource or the second set/list of resources.

For example, the indication of resource status, such as Hard/Soft/Not-Available or the priority level/flag can be provided by a DCI format or a MAC-CE that provides dynamic/aperiodic/semi-persistent beam indication or ON-OFF indication or can be provided by higher layer as part of a configuration for parameters of periodic or semi-persistent or aperiodic beam indication or ON-OFF indication or can be provided separately from such configurations. For example, a DCI format or a MAC-CE or an RRC configuration can provides a same indication of resource status, such as Hard/Soft/Not-Available or a same priority level, for all time/frequency resources corresponding to the indication or can provide separate indications of resource status or separate priority levels for each time/frequency resource or resource group or resource combination.

FIG. 19 illustrates an example flowchart for application of Hard and Soft resource status values for ON-OFF indication 1900 according to embodiments of the present disclosure. The embodiment of the flowchart for application of Hard and Soft resource status values for ON-OFF indication 1900 illustrated in FIG. 19 is for illustration only. FIG. 19 does not limit the scope of this disclosure to any particular implementation of the flowchart for application of Hard and Soft resource status values for ON-OFF indication 1900.

As illustrated in FIG. 19, at step 1910, an NCR-MT receives a higher layer indication providing first and second ON-OFF information for first and second symbols/slots, respectively. At step 1920, the NCR-MT receives higher layer or L1/L2 signaling indicating the first symbols/slots to be Hard and second symbols/slots to be Soft. At step 1930, the UE does not expect to receive L1/L2 signaling for first symbols/slots that provides ON-OFF information different from the first ON-OFF information. At step 1940, the UE receives L1/L2 signaling for second symbols/slots that provides ON-OFF information possibly different from the first ON-OFF information.

In one example, such resource status can be also applied to other NCR control information, such as beam or power control or DL/UL link direction, and so on. For example, when a resource status is indicated to be Hard or when a higher layer beam indication is associated with a Hard status, the NCR does not expect to receive an L1/L2 signaling to override the beam indication for the associated symbol or slot. For example, a beam indication for a symbol or slot with Soft status can be updated with subsequent L1/L2 signaling. In one example, a same resource status can be applied to ON-OFF state and other NCR control information. In one example, separate resource statuses can be applied for a same symbol or slot, such as a first resource status for ON-OFF and a second resource status for beam indication, for example, the ON-OFF status can be Hard, and the beam indication can be Soft.

For example, when an indication of a resource status or priority level/flag, such as a "Hard" resource status or a priority flag indicating a "True" value or a larger priority level index, is provided for a higher-layer beam indication such as for periodic beam indication for a resource (or resource set/list) and no resource status or priority level/flag is provided (or a resource status of "Soft" or a value "False" or a smaller priority level index is provided) for an L2 beam indication such as semi-persistent beam indication provided by a MAC-CE for the resource (or resource set/list), the higher layer/periodic beam indication overrides the L2/semi-persistent beam indication for the resource (or resource set/list). For example, such overriding applies to symbols or slots of a first resource (or a first resource set/list) associated with the L2/semi-persistent indication that overlaps with a second resource (or a second resource set/list) associated with the higher layer/periodic indication.

The example above can apply similarly to other NCR side control information, such as ON-OFF indication or power control information or TDD DL/UL information.

One embodiment includes NCR-initiates ON-OFF indication. An NCR can impact a selection of the ON-OFF state for the NCR-Fwd by initiating the ON-OFF indication, such as by requesting the gNB to set the NCR to ON state when the NCR-Fwd is otherwise OFF, or by requesting the gNB to set the NCR to OFF state when the NCR-Fwd is otherwise ON. Such ON-OFF request can become effective for the NCR-Fwd after confirmation by the gNB.

In a first realization, an NCR-MT can transmit an L1/L2 indication of "forwarding request" (FRQ) to the gNB to request the gNB to set the NCR to ON state and allow the NCR to perform the amplify-and-forward operation. For example, the NCR transmits a FRQ to stop/disable a higher layer OFF indication, such as one based on a pattern or a based on a DRX/DTX/DF-like indication, or an L1/L2 indication for ON-OFF. Such FRQ indication is similar to scheduling request (SR) indication transmitted by UEs to stop/disable a DRX off duration or 'sleep' time. For example, when the NCR transmits the FRQ indication, the NCR (re-)starts the amplify and forward operation, in a first symbol/slot after transmitting the FRQ indication, or N symbols/slots after transmitting the FRQ indication (wherein N can be predetermined or (pre)configured by higher layers such as OAM or RRC, and may also depend on NCR capability), or after receiving a HARQ-ACK feedback corresponding to the FRQ indication from the gNB, or after receiving an L1/L2 indication for ON-OFF (that indicates an ON states) or for other NCR-Fwd control information from the gNB.

In one example, when the NCR starts to perform the amplify and forward operation after an FRQ request, the NCR applies settings based on gNB indication or applies reference settings that are predetermined or (pre)configured to the NCR. Herein, setting can refer to one or more of: access or backhaul beam, power control parameters for NCR-Fwd such as an applicable amplification gain, DL/UL link direction, and so on.

In one example, from a symbol/slot in which the NCR transmits a FRQ indication until a symbol/slot in which the NCR receives (dedicated) control signaling associated with a set of symbols or slots, the NCR performs the amplify-and-forward operation only for certain predetermined transmissions, such as for cell-specific transmissions, for example, SSB or PRACH or PDCCH for system information, and so on.

Figure 20:
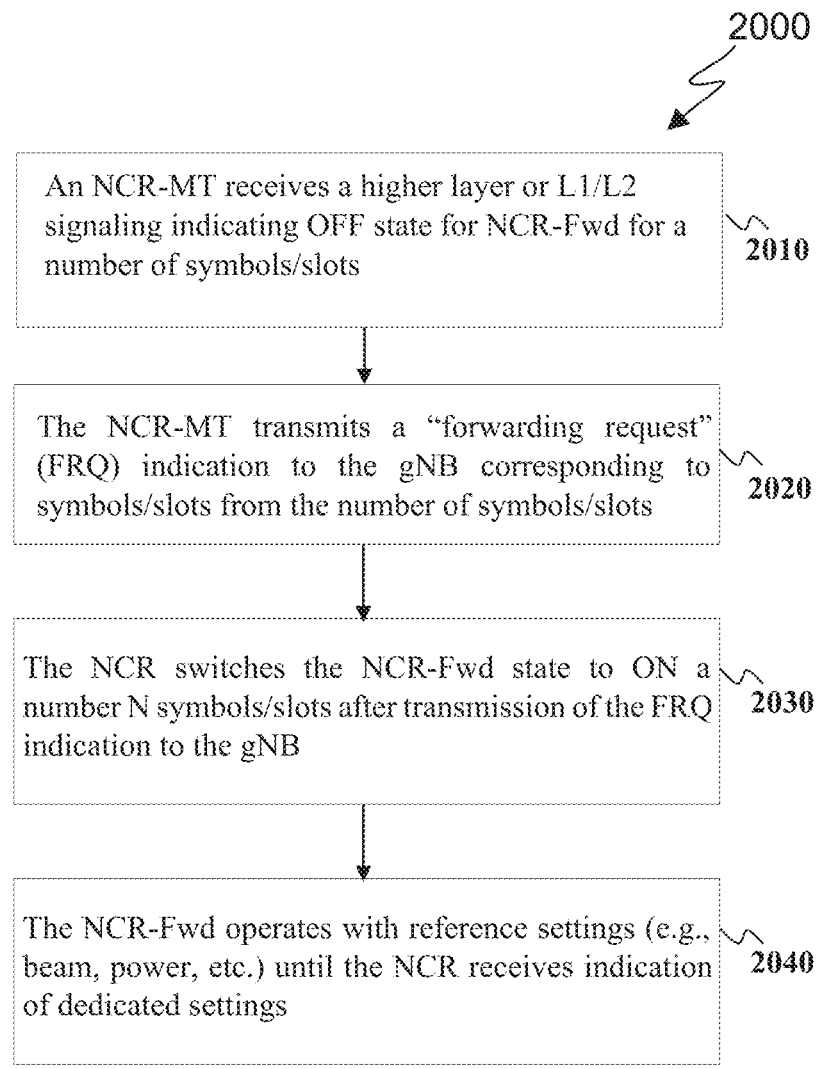
FIG. 20 illustrates another example flowchart for application of Hard and Soft resource status values for ON-OFF indication according to embodiments of the present disclosure.

FIG. 20 illustrates another example flowchart for application of Hard and Soft resource status values for ON-OFF indication 2000 according to embodiments of the present disclosure. The embodiment of the flowchart for application of Hard and Soft resource status values for ON-OFF indication 2000 illustrated in FIG. 20 is for illustration only. FIG. 20 does not limit the scope of this disclosure to any particular implementation of the flowchart for application of Hard and Soft resource status values for ON-OFF indication 2000.

As illustrated in FIG. 20, at step 2010, an NCR-MT receives a higher layer or L1/L2 signaling indicating OFF state for NCR-Fwd for a number of symbols/slots. At step 2020, the NCR-MT transmits a "forwarding request" (FRQ) indication to the gNB corresponding to symbols/slots from the number of symbols/slots. At step 2030, the NCR switches the NCR-Fwd state to ON a number N symbols/slots after transmission of the FRQ indication to the gNB. At step 2040, the NCR-Fwd operates with reference settings (e.g., beam, power, etc.) until the NCR receives indication of dedicated settings.

In a second realization, an NCR-MT can transmit an L1/L2 indication of "OFF request" (ORQ) to the gNB to request the gNB to switch off the NCR when the NCR-Fwd is otherwise in ON state, for example, due to higher layer indication (or L1/L2 signaling) for ON-OFF or for other NCR control information. Such behavior can be beneficial, for example, when the NCR detects no UE in coverage area of the NCR, or when the NCR needs to go to low-power mode, such as for energy saving, maintenance reasons, and so on. For example, when the NCR transmits the ORQ indication, the NCR stops/suspends the amplify and forward operation, N symbols/slots after transmitting the ORQ indication (wherein N can be predetermined or (pre)configured by higher layers such as OAM or RRC), or after receiving a HARQ-ACK feedback corresponding to the ORQ indication from the gNB, or after receiving an L1/L2 indication for ON-OFF or for other NCR-Fwd control information from the gNB. In one example, an ORQ indication can override higher layer indication for ON-OFF or for other NCR control information providing an ON state for the NCR-Fwd, and cannot override L1/L2 indication for ON state. In one example, an ORQ indication can also override an L1/L2 indication for ON-OFF or for other NCR control information providing an ON state for the NCR-Fwd.

In one embodiment, when an NCR requests or solicits an ON-OFF state for the NCR-Fwd for a symbol or slot from the gNB, an NCR can provide information of beams or spatial filters or associated reference signals (RSs), such as SSB indexes, with respect to which the NCR-Fwd is desired to be configured in the ON or OFF state. Such behavior can be beneficial for interference management, for example, when the NCR is operating with a subset of beams or associated RSs, such as a subset of SSB indexes, so that the NCR-Fwd does not amplify-and-forward RF signals associated with undesired spatial directions.

In one realization, when an NCR-Fwd identifies cell-specific transmissions or receptions, such as SSB or PRACH or monitoring occasions (MOs) corresponding to PDCCH for system information or paging, and so on, the NCR-MT can then indicate to the gNB a set/subset of desired beams or spatial filters or associated reference signals (RSs), such as a set/subset of desired SSB indexes, for which the NCR-Fwd is requested to be in ON state or a set/subset of these signals for which the NCR-Fwd indicates that OFF state is desired. Herein, identification of the ON or OFF states can be based on predetermined rules in the specifications for system operation or (pre)configuration by higher layer configuration such as system information, for example cell-specific SI (SIB1 or OSI) or an NCR-specific SIBx (x>1) or by common or dedicated RRC signaling or O&M signaling, or by L1/L2 indication such as a DCI format or a MAC-CE command. Herein, indication of the set/subset of desired beams, such as SSB indexes, can be by higher layer configuration or by L1/L2 signaling.

For example, the NCR determines that the NCR-Fwd is (pre)configured to perform amplify-and-forward (AF) corresponding to a first set of SSB indexes and the NCR-Fwd is expected to be ON during symbols/slots associated with the set of SSB indexes, and OFF during other symbols/slots associated with the any SSB index not included in the first set of SSB indexes. The NCR-Fwd applies a spatial filter in symbol(s)/slot(s) that corresponds to the SSB index. For example, the NCR-Fwd applies a first beam or spatial filter for symbols/slots associated with SSB #0 and applies a second beam or spatial filter for symbols/slots associated with SSB #1. The NCR determines a suitable second set of SSB indexes to indicate to the gNB its preference or a request for the ON-OFF configuration of the SSB indexes such that inter-link or self-interference is reduced or better manageable for the NCR or network nodes.

For example, higher layer configuration such as SIB1 can indicate a first set of SSB indexes configured for the cell, such as SSB indexes {#0, #1, . . . , #63} for example in FR2, and the NCR-Fwd performs AF operation on SSB indexes {#0, #1, #2, #3} only. In such case, the NCR-Fwd is in ON state only during symbols/slots associated with SSB indexes {#0, #1, #2, #3}, and is OFF state in during symbols/slots associated with other SSB indexes {#4, #5, . . . , #63}. In addition, for symbols/slots associated with SSB indexes {#0, #1, #2, #3}, the NCR-Fwd applies the corresponding spatial filters, so that interference from other spatial directions are avoided.

Herein, cell may refer to a cell, such as PCell, configured for NCR-MT, or a cell from the set of cells/carriers or passbands for which the NCR-Fwd may perform the AF operation. In one example, when multiple cells or passbands are applicable to NCR-MT or NCR-Fwd operation, in one option, a same set of beams or SSB indexes may apply to ON-OFF indication for the multiple cells or passbands. In another option, the NCR may determine separate beams such as separate SSB indexes that are applied for ON-OFF indication for each of the multiple cells or passbands.

In one example, the NCR indicates, solicits or requests a set of desired SSB indexes associated with ON-OFF indication by explicit signaling such as by higher layer configuration or by L1/L2 signaling. In another example, a combination can be considered, wherein the NCR may determine the set of desired or indicated SSB indexes associated with ON-OFF indication to be at least the SSB indexes provided as part of beamforming information, and the NCR can be provided additional SSB indexes by explicit signaling. For example, the NCR operates with SSB indexes {#0, #1, #2, #3}, and the gNB can indicates additional SSB indexes such as "neighbor" SSB indexes {#4, #63}, for example, in order to determine the UE activity in areas in the proximity of the NCR coverage areas. Therefore, the set of desired SSB indexes can be {#0, #1, #2, #3, #4, #63}, for which the NCR-Fwd is in ON state, and the is in OFF state for other SSB indexes {#5, #6, . . . , #62}.

In another example, ON-OFF behavior associated with SSB indexes may be associated and applied with other cell-specific transmissions or receptions. For example, the NCR-Fwd may be in ON state for any RACH occasion (RO) which is associated with the desired or indicated SSB indices, and may be in OFF state during other ROs associated with SSB indexes which are not included in the set of desired SSB indexes. For example, the NCR-Fwd may be in ON state during PDCCH monitoring occasions (MOs) for reception of system information or paging, and so on, (for example, based on CORESET #0 and Search Space set #0 or other related configuration) that are associated with the set of desired SSB indexes, and may be in OFF state during other PDCCH MOs associated with SSB indexes not included in the set of desired SSB indexes.

The examples can also be generalized to any uplink or downlink transmission or reception, such as SPS PDSCH or configured-grant PUSCH (CG-PUSCH) or other PDSCH/PDCCH or PUSCH/PUCCH, that are associated with the set of desired or indicted SSB indexes, wherein the NCR can pre-determine or be (pre)configured or be indicated an association with the SSB indexes for which a selected ON-OFF configuration is solicited or requested from the gNB. For example, the association of SSB indices for which a desired ON-OFF configuration is indicated by the NCR to the gNB can be applied to other RSs, such as non-cell defining SSB (NCD-SSB) or CSI-RS resources. For example, the RSs may be shared among a number of UEs, such as UEs served by the NCR. The NCR may be provided with applicable configuration information of such associated RSs to which the configured ON-OFF setting(s) apply, for example, time/frequency resource allocation of the RSs or Quasi-co-location (QCL) properties of the RS, such as spatial domain QCL (referred to as QCL Type-D). Accordingly, the NCR may request or solicit from the gNB or indicate to the gNB to be in ON states during a set of desired NCD-SSB indexes or a set of desired CSI-RS resources, from the configured NCD-SSBs or CSI-RS resource, and the NCR requests to be in OFF state during symbols/slots associated with other NCD-SSBs or CSI-RS resource not included in the set of desired NCD-SSB indexes or a set of desired CSI-RS resources. Similar holds for uplink or downlink transmission or reception associated with such RSs.

In one example, the NCR may receive higher layer reconfiguration message or L1/L2 signaling which updates the information of the set of SSB indexes (or for other RSs, as described above) which can be requested, indicated, or solicited from the gNB when the NCR signals its desired ON-OFF configuration. Accordingly, the NCR-MT may determine the beam-specific ON-OFF indication for the NCR-Fwd based on the updated information received from the gNB.

In one example, an indication for beam-specific ON-OFF signaled by the NCR to the gNB can include a certain value, such as "−1", that indicates the NCR-Fwd desires to be in ON states during symbols/slots associated with all beams or spatial filters, such as all SSB indexes. In another example, such behavior is considered to be the default NCR behavior, so when the NCR is not provided with any higher layer configuration or L1/L2 signaling for beam-specific ON-OFF indication, the NCR determines that NCR-Fwd is in ON state during symbols/slots associated with all beams or spatial filters, such as all SSB indexes, and no beam-specific ON-OFF configuration can be requested or solicited from the gNB for the corresponding beams.

In one example, two different beams or spatial filters corresponding to two different RSs may be associated with a same symbol or slot, and the NCR may request from or indicate to the gNB to be in ON state with respect to a first beam/RS and may request or indicate to be in OFF state with respect to the second beam/RS.

In one embodiment, when an NCR requests or solicits an ON-OFF state for the NCR-Fwd for a symbol or slot from the gNB, an NCR can provide information of a set of desired frequency resources, such as a set of RBs, with respect to which the NCR-Fwd desires or prefers to be in ON or OFF state. Accordingly, the NCR-Fwd can be configured by the gNB to be in ON state only for a first set of RBs in a symbol or slot, and in OFF state for other RBs in the same symbol or slot following reception of the ON-OFF request from the NCR associated with the frequency-domain resources. Such operation can be beneficial for interference management, for example, when the gNB and/or the NCR have information that a transmission or reception in a symbol or slot is confined to certain RBs, so NCR-Fwd is turned OFF in other RBs, so that noise amplification in those RBs are avoided. The operation can be subject to NCR capability.

In one realization, the NCR can determine or can be provided by the gNB a set of time-domain resources, such as a list or pattern of symbols or slots, during which the NCR-Fwd may request or indicate or solicit from the gNB to be in ON or OFF state(s), and the NCR can determine or can be provided by the gNB frequency domain resources, such as a list or pattern of RBs, RBGs or REs, corresponding to the time-domain resources in which the NCR-Fwd may be indicated or requested to be in ON or OFF state(s). For example, the NCR-Fwd may indicate to the gNB to be in ON state for a subset of RBs or RBGs from a set of allowed RBs or RBGs in a symbol or slot for a subset of symbols or slots from the list or pattern of symbols or slots for which an ON-OFF request from the NCR to the gNB is allowed or enabled. For example, a same frequency-domain behavior may apply, e.g., all RBs or RBGs in a symbol or slot are in the same ON or OFF state when not included in the list or pattern of symbols or slots.

In one example, the NCR can pre-determine or may be (pre-)configured with a number of RB groups or RB sets groups for the desired or indicated frequency-domain ON-OFF configuration to the gNB. For example, desired or indicated frequency-domain ON-OFF may be indicated by the NCR with respect to RB groups of size N RBs, for example N=4 or 8 or 16 or 64 RBs. The NCR pass bands may be grouped, for example to M such RB groups, each of size N RBs. The NCR-Fwd may be indicated, for a symbol or slot, to be in ON state for first set of RB groups and in OFF state for second set of RB groups, from the number of M RB groups. For example, the NCR pass band may be grouped in M=48 RB groups, and the NCR-Fwd may be indicated to be in ON state in RB groups {#10, #11, ..., #27} for a given symbol/slot #10. Accordingly, the NCR-Fwd is in OFF state for symbol/slot #10 in RB groups {#0, #1, ..., #9, #28, #29, ..., #47}. For example, the NCR-Fwd may be in ON state in first RB groups in a first symbol/slot, and may be in OFF state in a second RB group in a second symbol/slot.

In one example, the NCR-MT indicates to or solicits from the gNB which RB groups are desired ON and which RB groups are desired OFF for the NCR-Fwd or NCR-MT using higher layer signaling. In another example, the NCR-MT indicates information of the desired or preferred ON-OFF configuration for RBs or RB groups using L1/L2 signaling. In another example, the NCR may use a MAC-CE command or a UCI format to indicate the desired frequency-domain ON-OFF configuration to the gNB.

For NCR-Fwd backhaul beam indication, the NCR-MT can receive a new MAC-CE (subject to NCR capability) or use a predetermined rule to identify the backhaul beam from the set of beams configured for the C-link. For NCR-Fwd access link, the NCR-MT can receive periodic beam indication via RRC signaling, or semi-persistent beam indication via MAC-CE signaling.

For aperiodic beam indication for NCR-Fwd access link, the NCR-MT can receive a new DCI format such as DCI format 2_X (e.g., 2_8 with X=8) associated with a new dedicated RNTI for NCR-MT, such as NCR-RNTI or ABI-RNTI (wherein ABI stands for aperiodic beam indication). The NCR-MT can monitor a DCI format 2_X for aperiodic beam indication for NCR-Fwd access link in one or both of a Type-3 common search space (CSS) set or a dedicated/NCR-MT-specific/"UE"-specific search space (USS) set. In addition, a size of the DCI format 2_X can be configured by higher layers, possibly with a predetermined maximum limit such as 128 bits.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a network-controlled repeater (NCR), the method comprising:
   receiving, by an NCR mobile termination (NCR-MT) entity:
      first information for first time-domain resources and for corresponding first beams for an access link of an NCR forwarding (NCR-Fwd) entity, and
      second information for second time-domain resources and for corresponding second beams for the access link of the NCR-Fwd entity, wherein:
         a first time-domain resource from the first time-domain resources overlaps with a second time-domain resource from the second time-domain resources in a first set of symbols,
         the first time-domain resource corresponds to a first beam from the first beams,
         the second time-domain resource corresponds to a second beam from the second beams, the first time-domain resources are not associated with a priority flag, and the second time-domain resources are associated with the priority flag; and receiving or transmitting, by the NCR-Fwd entity, a first radio frequency (RF) signal on the access link using the second beam over the first set of symbols.

2. The method of claim 1, wherein:
the first information is indicated by medium access control control-element (MAC CE),
the second information is indicated by radio resource control (RRC) information, and
the priority flag is indicated by RRC information.

3. The method of claim 1, wherein:
the first information is indicated by a downlink control information (DCI) format,
the second information is indicated by one of:
 radio resource control (RRC) information, or
 a medium access control control-element (MAC CE), and
the priority flag is indicated by RRC information.

4. The method of claim 3, further comprising:
receiving, by the NCR-MT entity:
 third information for an NCR-specific search space set, and
 fourth information for an NCR radio network temporary identifier (NCR-RNTI) and for a cell RNTI (C-RNTI);
determining, by the NCR-MT entity, control channel elements (CCEs) based on the C-RNTI for receptions of physical downlink control channels (PDCCHs) associated with the NCR-specific search space set; and
receiving, by the NCR-MT entity, the PDCCHs in the CCEs, wherein:
 a PDCCH from the PDCCHs provides the DCI format, and
 cyclic redundancy check (CRC) bits of the DCI format are scrambled by the NCR-RNTI.

5. The method of claim 3, further comprising:
identifying, by the NCR-MT entity, a first number of slots, after a slot for a physical downlink control channel (PDCCH) reception providing the DCI format, as application time for the first beam;
receiving third information, by the NCR-MT entity, of a second number of slots as slot offset for the first time-domain resource; and
determining, by the NCR-MT entity, the first time-domain resource to be in a slot that is the second number of slots after the first number of slots.

6. The method of claim 1, further comprising:
receiving, by the NCR-MT entity:
 third information for third time-domain resources and for corresponding third beams for the access link of the NCR-Fwd entity, wherein:
  a third time-domain resource from the third time-domain resources overlaps with the first time-domain resource in a second set of symbols,
  the third time-domain resource corresponds to a third beam from the third beams, and
  the third time-domain resources are not associated with the priority flag,
receiving or transmitting, by the NCR-Fwd entity, a second RF signal on the access link using the first beam over the second set of symbols when the first time-domain resource and the third time-domain resource are respectively indicated by:
 a downlink control information (DCI) format and a medium access control control-element (MAC CE),
 a DCI format and radio resource control (RRC) information, or
 a MAC CE and RRC information.

7. The method of claim 1, further comprising:
receiving, by the NCR-MT entity, third information for third time-domain resources and for corresponding third beams for the access link of the NCR-Fwd entity, wherein:
 a third time-domain resource from the third time-domain resources overlaps with the first time-domain resource in a second set of symbols,
 the third time-domain resource corresponds to a third beam from the third beams, and
 the third time-domain resources are not associated with the priority flag; and
receiving or transmitting, by the NCR-Fwd entity, a second RF signal on the access link using the first beam over the second set of symbols when:
 the first information is indicated by a first downlink control information (DCI) format,
 the third information is indicated by a second DCI format, and
 a first physical downlink control channel (PDCCH) reception providing the first DCI format starts after a second PDCCH reception providing the second DCI format.

8. A network-controlled repeater (NCR) comprising:
a transceiver of an NCR mobile termination (NCR-MT) entity configured to receive:
 first information for first time-domain resources and for corresponding first beams for an access link of an NCR forwarding (NCR-Fwd) entity, and
 second information for second time-domain resources and for corresponding second beams for the access link of the NCR-Fwd entity, wherein:
  a first time-domain resource from the first time-domain resources overlaps with a second time-domain resource from the second time-domain resources in a first set of symbols,
  the first time-domain resource corresponds to a first beam from the first beams,
  the second time-domain resource corresponds to a second beam from the second beams,
  the first time-domain resources are not associated with a priority flag, and
  the second time-domain resources are associated with the priority flag; and
a processor of the NCR-MT entity operably coupled to the transceiver of the NCR-MT entity, the processor of the NCR-MT entity configured to determine an association between the first and second time-domain resources and the priority flag;
a transceiver of the NCR-Fwd entity operably coupled to the processor of the NCR-MT entity, the transceiver of the NCR-Fwd entity configured to receive or transmit a first radio frequency (RF) signal on the access link using the second beam over the first set of symbols.

9. The NCR of claim 8, wherein:
the first information is indicated by medium access control control-element (MAC CE),
the second information is indicated by radio resource control (RRC) information, and
the priority flag is indicated by RRC information.

10. The NCR of claim 8, wherein:
the first information is indicated by a downlink control information (DCI) format,
the second information is indicated by one of:
  radio resource control (RRC) information, or
  a medium access control control-element (MAC CE), and
the priority flag is indicated by RRC information.

11. The NCR of claim 10, wherein:
the transceiver of the NCR-MT entity is further configured to receive:
  third information for an NCR-specific search space set, and
  fourth information for an NCR radio network temporary identifier (NCR-RNTI) and for a cell RNTI (C-RNTI);
the processor of the NCR-MT entity is further configured to determine control channel elements (CCEs) based on the C-RNTI for receptions of physical downlink control channels (PDCCHs) associated with the NCR-specific search space set; and
the transceiver of the NCR-MT entity is further configured to receive the PDCCHs in the CCE, wherein:
  a PDCCH from the PDCCHs provides the DCI format; and
  cyclic redundancy check (CRC) bits of the DCI format are scrambled by the NCR-RNTI.

12. The NCR of claim 10, wherein:
the processor of the NCR-MT entity is further configured to identify a first number of slots, after a slot for a physical downlink control channel (PDCCH) reception providing the DCI format, as application time for the first beam;
the transceiver of the NCR-MT entity is further configured to: receive third information of a second number of slots as slot offset for the first time-domain resource; and
the processor of the NCR-MT entity is further configured to determine the first time-domain resource to be in a slot that is the second number of slots after the first number of slots.

13. The NCR of claim 8, wherein:
the transceiver of the NCR-MT entity is further configured to receive:
  third information for third time-domain resources and for corresponding third beams for the access link of the NCR-Fwd entity, wherein:
    a third time-domain resource from the third time-domain resources overlaps with the first time-domain resource in a second set of symbols,
    the third time-domain resource corresponds to a third beam from the third beams, and
    the third time-domain resources are not associated with the priority flag;
the processor of the NCR-MT entity is further configured to determine an association between the first and third time-domain resources and the priority flag; and
the transceiver of the NCR-Fwd entity is further configured to receive or transmit a second RF signal on the access link using the first beam over the second set of symbols when the first time-domain resource and the third time-domain resource are respectively indicated by:
  a downlink control information (DCI) format and a medium access control control-element (MAC CE),
  a DCI format and radio resource control (RRC) information, or
  a MAC CE and RRC information.

14. The NCR of claim 8, wherein:
the transceiver of the NCR-MT entity is further configured to receive third information for third time-domain resources and for corresponding third beams for the access link of the NCR-Fwd entity,
a third time-domain resource from the third time-domain resources overlaps with the first time-domain resource in a second set of symbols,
the third time-domain resource corresponds to a third beam from the third beams,
the third time-domain resources are not associated with the priority flag,
the processor of the NCR-MT entity is further configured to determine an association between the first and third time-domain resources and the priority flag, and
the transceiver of the NCR-Fwd entity is further configured to receive or transmit a second RF signal on the access link using the first beam over the second set of symbols when:
  the first information is indicated by a first downlink control information (DCI) format,
  the third information is indicated by a second DCI format, and
  a first physical downlink control channel (PDCCH) reception providing the first DCI format starts after a second PDCCH reception providing the second DCI format.

15. A base station comprising:
a transceiver configured to transmit, to a network-controlled repeater mobile termination (NCR-MT) entity:
  first information for first time-domain resources and for corresponding first beams for an access link of a network-controlled repeater forwarding (NCR-Fwd) entity, and
  second information for second time-domain resources and for corresponding second beams for the access link of the NCR-Fwd entity, wherein:
    a first time-domain resource from the first time-domain resources overlaps with a second time-domain resource from the second time-domain resources in a first set of symbols,
    the first time-domain resource corresponds to a first beam from the first beams,
    the second time-domain resource corresponds to a second beam from the second beams,
    the first time-domain resources are not associated with a priority flag, and
    the second time-domain resources are associated with the priority flag; and
a processor operably coupled to the transceiver, the processor configured to determine an association between the first and second time-domain resources and the priority flag,
wherein the transceiver is further configured to transmit or receive a first radio frequency (RF) signal on a backhaul link of the NCR-Fwd entity over the first set of symbols.

16. The base station of claim 15, wherein:
the first information is indicated by medium access control control-element (MAC CE),
the second information is indicated by radio resource control (RRC) information, and
the priority flag is indicated by RRC information.

17. The base station of claim 15, wherein:
the first information is indicated by a downlink control information (DCI) format, the second information is indicated by one of:
  radio resource control (RRC) information, or
  a medium access control control-element (MAC CE), and
the priority flag is indicated by RRC information.

18. The base station of claim 17, wherein:
the transceiver is configured to transmit to the NCR-MT entity:
  third information for an NCR-specific search space set, and
  fourth information for an NCR radio network temporary identifier (NCR-RNTI) and for a cell RNTI (C-RNTI),
the processor is further configured to determine control channel elements (CCEs) based on the C-RNTI for transmissions of physical downlink control channels (PDCCHs) associated with the NCR-specific search space set, and
the transceiver is further configured to transmit, to the NCR-MT entity, the PDCCHs in the CCEs, wherein:
  a PDCCH from the PDCCHs provides the DCI format, and
  cyclic redundancy check (CRC) bits of the DCI format are scrambled by the NCR-RNTI.

19. The base station of claim 17, wherein:
the processor is further configured to identify a first number of slots, after a slot for a physical downlink control channel (PDCCH) transmission providing the DCI format, as application time for the first beam;
the transceiver is further configured to transmit third information of a second number of slots as slot offset for the first time-domain resource; and
the processor is further configured to determine the first time-domain resource to be in a slot that is the second number of slots after the first number of slots.

20. The base station of claim 15, wherein:
the transceiver is further configured to transmit, to the NCR-MT entity, third information for third time-domain resources and for corresponding third beams for the access link of the NCR-Fwd entity, wherein:
  a third time-domain resource from the third time-domain resources overlaps with the first time-domain resource in a second set of symbols,
  the third time-domain resource corresponds to a third beam from the third beams, and
  the third time-domain resources are not associated with the priority flag;
the processor is further configured to determine an association between the first and third time-domain resources and the priority flag; and
the transceiver is further configured to transmit or receiver a second RF signal on the backhaul link of the NCR-Fwd entity over the second set of symbols when the first time-domain resource and the third time-domain resource are respectively indicated by:
  a downlink control information (DCI) format and a medium access control control-element (MAC CE),
  a DCI format and radio resource control (RRC) information, or
  a MAC CE and RRC information.

* * * * *